United States Patent
Xiao et al.

(10) Patent No.: US 12,082,172 B2
(45) Date of Patent: Sep. 3, 2024

(54) DATA SENDING METHOD, DATA RECEIVING METHOD, APPARATUS, AND SYSTEM

(71) Applicant: HUAWEI TECHNOLOGIES CO., LTD., Guangdong (CN)

(72) Inventors: Jiehua Xiao, Shenzhen (CN); Zhenfei Tang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 670 days.

(21) Appl. No.: 17/144,306

(22) Filed: Jan. 8, 2021

(65) Prior Publication Data

US 2021/0136763 A1   May 6, 2021

Related U.S. Application Data

(63) Continuation of application No. PCT/CN2019/089984, filed on Jun. 4, 2019.

(30) Foreign Application Priority Data

Jul. 10, 2018   (CN) ......................... 201810753786.2

(51) Int. Cl.
   *H04W 72/0453*   (2023.01)
   *H04W 72/1268*   (2023.01)
   *H04W 72/1273*   (2023.01)

(52) U.S. Cl.
   CPC ... *H04W 72/0453* (2013.01); *H04W 72/1268* (2013.01); *H04W 72/1273* (2013.01)

(58) Field of Classification Search
   None
   See application file for complete search history.

(56) References Cited

U.S. PATENT DOCUMENTS

| | | | |
|---|---|---|---|
| 8,386,874 B2 | 2/2013 | Pelletier et al. | |
| 2015/0117396 A1* | 4/2015 | Wang | H04L 5/0091 370/330 |

(Continued)

FOREIGN PATENT DOCUMENTS

| | | |
|---|---|---|
| CN | 101325573 A | 12/2008 |
| CN | 101911641 A | 12/2010 |

(Continued)

OTHER PUBLICATIONS

3GPP TSG RAN WG1 NR Ad Hoc Meeting, R1-1709978, TB mapping and TB size determination, Huawei, HiSilicon, Qingdao, China, Jun. 27-30, 2017, total 8 pages. (Year: 2017).*

(Continued)

*Primary Examiner* — Liem H. Nguyen
(74) *Attorney, Agent, or Firm* — WOMBLE BOND DICKINSON (US) LLP

(57) ABSTRACT

A data sending method, a data receiving method, an apparatus, and a system are provided. The method includes: determining M data parts corresponding to N TBs, where N is an integer greater than or equal to 1, and M is an integer greater than or equal to 2; mapping the M data parts to Q BWPs, where Q is an integer greater than or equal to 2, Q is less than or equal to M, one of the N TBs corresponds to at least two data parts, and the at least two data parts are respectively mapped to different BWPs; and sending the M data parts in the Q BWPs.

15 Claims, 32 Drawing Sheets

(56) References Cited

U.S. PATENT DOCUMENTS

| | | | | |
|---|---|---|---|---|
| 2016/0234812 | A1* | 8/2016 | Kim | H04L 27/34 |
| 2018/0278368 | A1* | 9/2018 | Kim | H04L 1/0048 |
| 2018/0287752 | A1* | 10/2018 | Park | H04L 5/0044 |
| 2019/0141734 | A1* | 5/2019 | Lei | H04W 72/23 |
| 2019/0313386 | A1* | 10/2019 | Hwang | H04W 72/23 |
| 2019/0356430 | A1* | 11/2019 | Cheng | H04W 72/23 |
| 2020/0059961 | A1* | 2/2020 | Do | H04W 72/0453 |
| 2020/0162207 | A1* | 5/2020 | Hwang | H04L 1/1893 |
| 2020/0383090 | A1* | 12/2020 | Myung | H04L 1/1614 |
| 2021/0021383 | A1* | 1/2021 | Chen | H04W 72/23 |
| 2021/0226732 | A1* | 7/2021 | Yeo | H04L 1/00 |
| 2021/0243711 | A1* | 8/2021 | Yeo | H04W 56/0015 |
| 2021/0377108 | A1* | 12/2021 | Cho | H04L 41/0896 |

FOREIGN PATENT DOCUMENTS

| | | |
|---|---|---|
| CN | 104854813 A | 8/2015 |
| CN | 105589506 A | 5/2016 |
| CN | 107113100 A | 8/2017 |
| CN | 108111444 A | 6/2018 |
| EP | 3817477 A1 | 5/2021 |
| WO | 2010079849 A1 | 7/2010 |
| WO | 2018085145 A1 | 5/2018 |

OTHER PUBLICATIONS

3GPP TSG RAN WG1 NR Ad Hoc Meeting, R1-1709978, Overview of wider bandwidth operations, Huawei, HiSilicon, Qingdao, China, Jun. 27-30, 2017, total 9 pages. (Year: 2017).*

3GPP TSG RAN WG1 NR Ad Hoc Meeting, R1-1709972, Overview of wider bandwidth operations, Huawei, HiSilicon, Qingdao, China, Jun. 27-30, 2017, total 9 pages.

Huawei et al.,"CR on BWP configuration and procedure", 3GPP TSG-RAN WG2 NR #102 R2-1808587,Busan, Korea, May 21-25, 2018 , Total 7 Pages.

* cited by examiner

DATA SENDING METHOD, DATA RECEIVING METHOD, APPARATUS, AND SYSTEM

CROSS-REFERENCE TO RELATED APPLICATIONS

This application is a continuation of International Application No. PCT/CN2019/089984, filed on Jun. 4, 2019, which claims priority to Chinese Patent Application No. 201810753786.2, filed on Jul. 10, 2018. The disclosures of the aforementioned applications are hereby incorporated by reference in their entireties.

TECHNICAL FIELD

This application relates to the field of mobile communications technologies, and in particular, to a data sending method, a data receiving method, an apparatus, and a system.

BACKGROUND

In a 5th generation mobile communications (5G) new radio (NR) system, a system bandwidth or a carrier bandwidth may reach 400 megahertz (MHz). However, a bandwidth capability supported by a terminal device is usually less than the system bandwidth or the carrier bandwidth. The bandwidth capability of the terminal device may be a maximum bandwidth size supported by the terminal device. For example, the bandwidth capability supported by the terminal device may be 20 MHz, 50 MHz, or 100 MHz.

In the NR system, to adapt to the bandwidth capability of the terminal device, one or more bandwidth parts (BWP) may be configured for the terminal device in a carrier. One BWP may include a segment of consecutive resources in frequency domain. For example, one BWP includes a group of consecutive resource blocks (RB) in a carrier. When data transmission needs to be performed, a network device may activate a BWP configured for the terminal device, to perform data transmission with the terminal device in the active BWP.

As a bandwidth of a 5G system increases, frequency resources used for communication in 5G become richer, a quantity of terminal devices that can access the NR system increases, and a volume of data transmitted between terminal devices and between a terminal device and a network device also increases sharply. Therefore, how to properly use frequency resources to improve data transmission efficiency is a problem worthy of study.

SUMMARY

Embodiments of this application provide a data sending method, a data receiving method, an apparatus, and a system, so that a sending device sends a same TB to a receiving device by using a plurality of discrete frequency resources, thereby improving data transmission efficiency.

According to a first aspect, an embodiment of this application provides a data sending method. The method may be performed by a sending device or a communications apparatus (for example, a chip system) that can support a sending device in implementing the method. In this application, an example in which the sending device performs the method is used for description. The sending device may be a network device or a terminal device. The method includes: determining M data parts corresponding to N TBs, where N is an integer greater than or equal to 1, and M is an integer greater than or equal to 2; mapping the M data parts to Q BWPs, where Q is an integer greater than or equal to 2, Q is less than or equal to M, one of the N TBs corresponds to at least two data parts, and the at least two data parts are respectively mapped to different BWPs; and sending the M data parts in the Q BWPs.

According to the foregoing method, the sending device may respectively map the at least two data parts of one of the N TBs to a plurality of different BWPs in one carrier, or the sending device may respectively map the at least two data parts of one of the N TBs to a plurality of different BWPs in a plurality of carriers. Therefore, when there are a plurality of available carrier resources in a serving cell in which the sending device and a receiving device are located, in the foregoing method, an advantage of a frequency diversity can be fully utilized, for example, a same TB can be sent by using a plurality of discrete frequency resources (for example, BWPs). Because a probability that all data parts sent on different frequency resources fall into fading is relatively low, a probability that all data parts included in one TB are incorrectly sent is relatively low, so that data transmission accuracy can be improved, and then data transmission efficiency is improved.

Alternatively, the data sending method provided in the first aspect may be: separately determining M data parts corresponding to each of N TBs, where N is an integer greater than or equal to 1, and M is an integer greater than or equal to 2; respectively mapping the M data parts corresponding to each TB to Q BWPs, where Q is an integer greater than or equal to 2, and Q is less than or equal to M; and sending, in the Q BWPs, the M data parts corresponding to each TB.

According to the foregoing method, the sending device may respectively map M data parts corresponding to each of a plurality of TBs to a plurality of different BWPs in one carrier or a plurality of different BWPs in a plurality of carriers. An advantage of a frequency diversity is fully utilized, and a same TB is sent by using a plurality of discrete frequency resources (for example, BWPs). Because a probability that all data parts sent on different frequency resources fall into fading is relatively low, a probability that all data parts included in one TB are incorrectly sent is relatively low, so that data transmission accuracy can be improved, and then data transmission efficiency is improved.

In an embodiment of this application, how to determine the M data parts corresponding to the N TBs is not limited.

In an embodiment, M CBs may be determined based on the N TBs, and the M CBs are the M data parts. Alternatively, M bits are determined based on the N TBs, and the M bits are the M data parts. Alternatively, M CBs are determined based on the N TBs, channel coding is performed on the M CBs to obtain M encoded output blocks, and the M data parts are determined based on the M encoded output blocks. Alternatively, P CBs are determined based on the N TBs, channel coding is performed on the P CBs to obtain P encoded output blocks, M encoded CBGs are determined based on the P encoded output blocks, where each encoded CBG corresponds to at least one CB, and the M data parts are determined based on the M encoded CBGs, where P is an integer greater than or equal to M. Alternatively, M symbols are determined based on the N TBs, and the M data parts are determined based on the M symbols.

In an embodiment of this application, a method used to map the M data parts to the Q BWPs is not limited.

In an embodiment, the M data parts may be evenly mapped to the Q BWPs. That the M data parts are evenly mapped to the Q BWPs may mean that after the M data parts are mapped to the Q BWPs, a difference between quantities of data parts mapped to any two of the Q BWPs is less than a preset threshold, and the preset threshold may be determined based on an actual situation, for example, may be 1, or may be 2. This is not limited in this application.

The following provides two possible methods for evenly mapping the M data parts to the Q BWPs.

In an embodiment, F data parts are mapped to each of Q−1 BWPs included in the Q BWPs, where F is an integer obtained after $$\frac{M}{Q}$$

is rounded off; and M−(Q−1)·F data parts are mapped to one BWP, included in the Q BWPs, other than the Q−1 BWPs.

In another embodiment, $$\left\lceil \frac{M}{Q} \right\rceil$$

data parts are mapped to each of Q−1 BWPs included in the Q BWPs, and $$M - (Q-1) \cdot \left\lceil \frac{M}{Q} \right\rceil$$

data parts are mapped to one BWP, included in the Q BWPs, other than the Q−1 BWPs.

In still another embodiment, $$\left\lfloor \frac{M}{Q} \right\rfloor$$

data parts are mapped to each of Q−1 BWPs included in the Q BWPs, and $$M - (Q-1) \cdot \left\lfloor \frac{M}{Q} \right\rfloor$$

data parts are mapped to one BWP, included in the Q BWPs, other than the Q−1 BWPs.

In yet another embodiment, $M_1$ is defined, and $M_1$ may satisfy a formula: $M_1 = \mod(M, Q)$.

If $M_1$ is equal to 0, $$\frac{M}{Q}$$

data parts are mapped to each of the Q BWPs; or if $M_1$ is greater than 0, $$\left\lceil \frac{M}{Q} \right\rceil$$

data parts are mapped to each of $M_1$ BWPs included in the Q BWPs, and $$\left\lfloor \frac{M}{Q} \right\rfloor$$

data parts are mapped to each BWP, included in the Q BWPs, other than the $M_1$ BWPs.

According to a second aspect, an embodiment of this application provides a communications apparatus. The apparatus may be a network device or a terminal device, or may be an apparatus in a network device or an apparatus in a terminal device. The apparatus may include a communications module and a processing module, and these modules may perform the method in any one of the first aspect or the possible implementations of the first aspect. Details are as follows:

The processing module is configured to: determine M data parts corresponding to N TBs, where N is an integer greater than or equal to 1, and M is an integer greater than or equal to 2; and map the M data parts to Q BWPs, where Q is an integer greater than or equal to 2, Q is less than or equal to M, one of the N TBs corresponds to at least two data parts, and the at least two data parts are respectively mapped to different BWPs.

The communications module is configured to send the M data parts in the Q BWPs.

Alternatively, when a communications module and a processing module that are included in the communications apparatus provided in the second aspect perform the method in any one of the first aspect or the possible implementations of the first aspect, details may be as follows:

The processing module is configured to: separately determine M data parts corresponding to each of N TBs, where N is an integer greater than or equal to 1, and M is an integer greater than or equal to 2; and respectively map the M data parts corresponding to each TB to Q BWPs, where Q is an integer greater than or equal to 2, and Q is less than or equal to M.

The communications module is configured to respectively send, in the Q BWPs, the M data parts corresponding to each TB.

In an embodiment, the processing module is configured to: determine M CBs based on the N TBs, where the M CBs are the M data parts; determine M bits based on the N TBs, where the M bits are the M data parts; determine M CBs based on the N TBs, perform channel coding on the M CBs to obtain M encoded output blocks, and determine the M data parts based on the M encoded output blocks; determine P CBs based on the N TBs, perform channel coding on the P CBs to obtain P encoded output blocks, determine M encoded CBGs based on the P encoded output blocks, where each encoded CBG corresponds to at least one CB, and determine the M data parts based on the M encoded CBGs, where P is an integer greater than or equal to M; or determine M symbols based on the N TBs, and determine the M data parts based on the M symbols.

In an embodiment, the processing module is configured to evenly map the M data parts to the Q BWPs.

In an embodiment, the processing module is configured to: map F data parts to each of Q−1 BWPs included in the Q BWPs, where F is an integer obtained after $$\frac{M}{Q}$$

is rounded off, and map M−(Q−1)·F data parts to one BWP, included in the Q BWPs, other than the Q−1 BWPs.

In an embodiment, the processing module is configured to: if $M_1$ is equal to 0, map $$\frac{M}{Q}$$

data parts to each of the Q BWPs; or if $M_1$ is greater than 0, map $$\left\lceil \frac{M}{Q} \right\rceil$$

data arts to each of $M_1$ BWPs included in the Q BWPs, and map $$\left\lfloor \frac{M}{Q} \right\rfloor$$

data parts to each BWP, included in the Q BWPs, other than the $M_1$ BWPs, where $M_1$ satisfies a formula: $M_1$=mod(M,Q).

According to a third aspect, another communications apparatus is provided. The communications apparatus includes a processor, configured to implement the method in the first aspect. The communications apparatus may further include a memory, configured to store a program instruction and data. The memory is coupled to the processor. The processor may invoke and execute the program instruction stored in the memory, to implement the method in the first aspect. The communications apparatus may further include a communications interface, and the communications interface is used by the communications apparatus to communicate with another device. For example, the communications interface is, for example, a transceiver. For example, the another device is a network device or a terminal device.

In an embodiment, the communications apparatus includes a memory, a processor, and a communications interface.

The memory is configured to store a program instruction.

The processor is configured to: determine M data parts corresponding to N TBs, where N is an integer greater than or equal to 1, and M is an integer greater than or equal to 2; and map the M data parts to Q BWPs, where Q is an integer greater than or equal to 2, Q is less than or equal to M, one of the N TBs corresponds to at least two data parts, and the at least two data parts are respectively mapped to different BWPs.

The processor sends the M data parts in the Q BWPs through the communications interface.

Alternatively, the communications apparatus provided in the third aspect may further include a memory, a processor, and a communications interface.

The memory is configured to store a program instruction.

The processor is configured to: separately determine M data parts corresponding to each of N TBs, where N is an integer greater than or equal to 1, and M is an integer greater than or equal to 2; and respectively map the M data parts corresponding to each TB to Q BWPs, where Q is an integer greater than or equal to 2, and Q is less than or equal to M.

The processor respectively sends, in the Q BWPs through the communications interface, the M data parts corresponding to each TB.

In an embodiment, the processor is configured to: determine M CBs based on the N TBs, where the M CBs are the M data parts; determine M bits based on the N TBs, where the M bits are the M data parts; determine M CBs based on the N TBs, perform channel coding on the M CBs to obtain M encoded output blocks, and determine the M data parts based on the M encoded output blocks; determine P CBs based on the N TBs, perform channel coding on the P CBs to obtain P encoded output blocks, determine M encoded CBGs based on the P encoded output blocks, where each encoded CBG corresponds to at least one CB, and determine the M data parts based on the M encoded CBGs, where P is an integer greater than or equal to M; or determine M symbols based on the N TBs, and determine the M data parts based on the M symbols.

In an embodiment, the processor is configured to evenly map the M data parts to the Q BWPs.

In an embodiment, the processor is configured to: map F data parts to each of Q−1 BWPs included in the Q BWPs, where F is an integer obtained after $$\frac{M}{Q}$$

is rounded off; and map M−(Q−1)·F data parts to one BWP, included in the Q BWPs, other than the Q−1 BWPs.

In an embodiment, the processor is configured to: if $M_1$ is equal to 0, map $$\frac{M}{Q}$$

data parts to each of the Q BWPs; or if $M_1$ is greater than 0, map $$\left\lceil \frac{M}{Q} \right\rceil$$

data parts to each of $M_1$ BWPs included in the Q BWPs, and map $$\left\lfloor \frac{M}{Q} \right\rfloor$$

data parts to each BWP, included in the Q BWPs, other than the $M_1$ BWPs, where $M_1$ satisfies a formula: $M_1$=mod(M,Q).

According to a fourth aspect, an embodiment of this application provides a data receiving method. The method includes: receiving, in Q bandwidth parts BWPs, M data parts corresponding to N transport blocks TBs, where N is an integer greater than or equal to 1, M is an integer greater than or equal to 2, Q is an integer greater than or equal to 2, Q is less than or equal to M, one of the N TBs corresponds to at least two data parts, and the at least two data parts are respectively mapped to different BWPs.

According to a fifth aspect, an embodiment of this application provides a communications apparatus. The apparatus may include a communications module and a processing module. The modules may perform the method in any one of the fourth aspect or the possible implementations of the fourth aspect. Details are as follows:

The processing module receives, in Q bandwidth parts BWPs by using the communications module, M data parts corresponding to N transport blocks TBs, where N is an integer greater than or equal to 1, M is an integer greater than or equal to 2, Q is an integer greater than or equal to 2, Q is less than or equal to M, one of the N TBs corresponds to at least two data parts, and the at least two data parts are respectively mapped to different BWPs.

According to a sixth aspect, an embodiment of this application provides a communications apparatus. The apparatus may include a processor and a communications interface, and may perform the method in any one of the fourth aspect or the possible implementations of the fourth aspect. Details are as follows:

The processor receives, in Q bandwidth parts BWPs through the communications interface, M data parts corresponding to N transport blocks TBs, where N is an integer greater than or equal to 1, M is an integer greater than or equal to 2, Q is an integer greater than or equal to 2, Q is less than or equal to M, one of the N TBs corresponds to at least two data parts, and the at least two data parts are respectively mapped to different BWPs.

According to a seventh aspect, an embodiment of this application further provides a computer-readable storage medium, including an instruction. When the instruction is run on a computer, the computer is enabled to perform the method provided in any one of the first aspect or the possible designs of the first aspect, or the computer is enabled to perform the method provided in the fourth aspect.

According to an eighth aspect, an embodiment of this application further provides a computer program product, including an instruction. When the computer program product runs on a computer, the computer is enabled to perform the method in any one of the first aspect or the possible designs of the first aspect, or the computer is enabled to perform the method in the fourth aspect.

According to a ninth aspect, an embodiment of this application provides a chip system. The chip system includes a processor and may further include a memory, to implement the method in any one of the first aspect or the possible implementations of the first aspect, or configured to implement the method in the fourth aspect. The chip system may include a chip, or may include a chip and another discrete component.

According to a tenth aspect, an embodiment of this application provides a communications system. The communications system includes the communications apparatus in any one of the second aspect or the possible implementations of the second aspect, and includes the communications apparatus in the fifth aspect.

According to an eleventh aspect, an embodiment of this application provides a communications system. The communications system includes the communications apparatus in any one of the third aspect or the possible implementations of the third aspect, and includes the communications apparatus in the sixth aspect.

DESCRIPTION OF EMBODIMENTS

Figure 1:
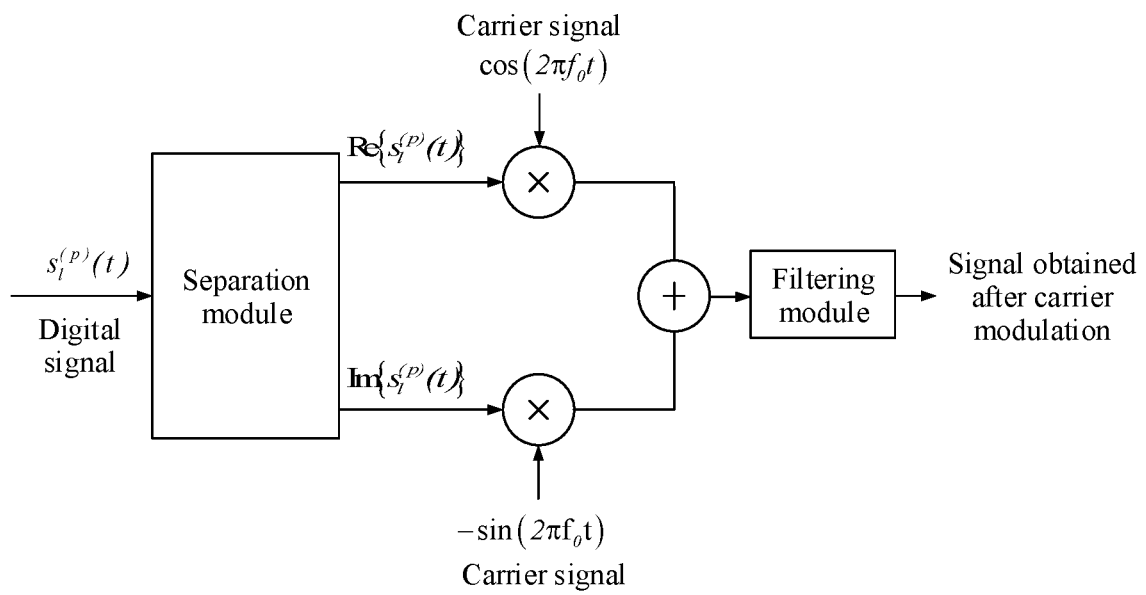
FIG. 1 is a schematic diagram of a carrier signal generation method.

The following describes this application in detail with reference to the accompanying drawings of this specification.

Some terms in this application are first described to help one of ordinary skilled in the art have a better understanding.

(1) A terminal device may be a device that provides voice and/or data connectivity for a user, and is also referred to as user equipment (UE), a mobile station (MS), a mobile terminal (MT), or the like. For example, the terminal device is a handheld device or a vehicle-mounted device that has a wireless connection function. Currently, examples of some terminal devices are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

(2) A network device may be a device in a wireless network, for example, a radio access network (RAN) node (or device) that connects a terminal device to the wireless network, and may also be referred to as abase station. Currently, examples of some RAN nodes are: a next generation NodeB (gNB), a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), and the like. In addition, in a network structure, a RAN may include a central unit (CU) node and a distributed unit (DU) node. In this structure, a protocol layer of an eNB in a long term evolution (LTE) system is split, where some functions of the protocol layer are controlled by the CU in a centralized manner, remaining part or all remaining of functions of the protocol layer are distributed in DUs, and the CU controls the DUs in a centralized manner.

(3) Sending device: A sending device in this application may be a terminal device, or may be a network device. This is not limited in this application.

(4) Receiving device: A receiving device in this application may be a terminal device, or may be a network device. This is not limited in this application. In this application, when the sending device is a terminal device, the receiving device may be a network device. When the sending device is a network device, the receiving device may be a terminal device. In the following description, an example in which the sending device is a network device and the receiving device is a terminal device may be used for description.

(5) A system bandwidth is a bandwidth supported by a carrier in an NR system, and may also be referred to as a carrier bandwidth, a carrier, or the like. For example, the carrier bandwidth in the NR system may be one of 10 MHz, 15 MHz, 20 MHz, 50 MHz, 100 MHz, 400 MHz, and the like.

(6) A carrier may be a radio wave used to modulate a to-be-sent digital signal, and is usually a sine wave. In a wireless communications technology, a sending device modulates a to-be-sent digital signal to a high-frequency carrier, and then sends a modulated signal to a receiving device through an air interface. Referring to FIG. 1, a carrier in FIG. 1 is generated based on a center frequency $f_0$, where $S_l^{(p)}(t)$ indicates a to-be-sent digital signal that carries data information, Re{X} indicates taking a real part of X, and Im{X} indicates taking an imaginary part of X. A filtering module is configured to adjust a radio frequency indicator of the to-be-sent signal, and the to-be-sent digital signal is sent to a receiving device after carrier modulation. A carrier signal is usually a sine signal used to modulate a to-be-transmitted digital signal, and is a concept corresponding to the carrier.

Figure 2A:
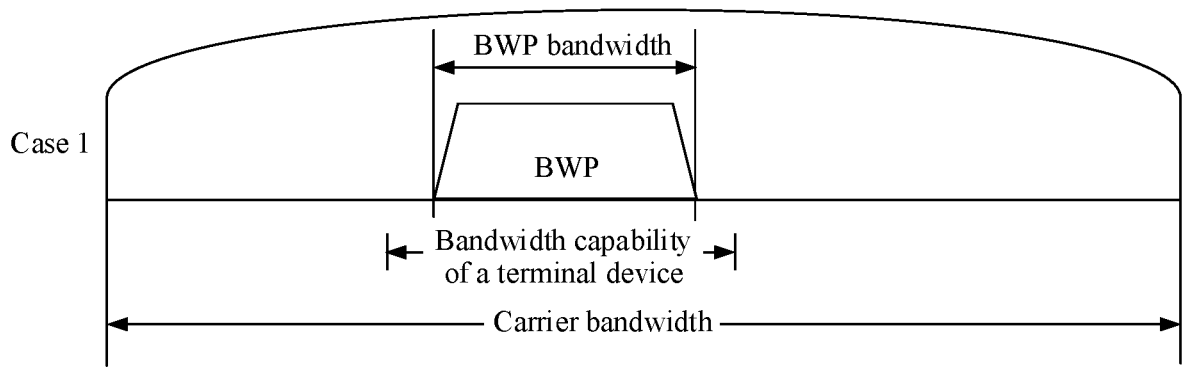
FIG. 2a to FIG. 2c are schematic diagrams of configuration of a BWP in a carrier bandwidth according to an embodiment of this application.
Figure 2B:
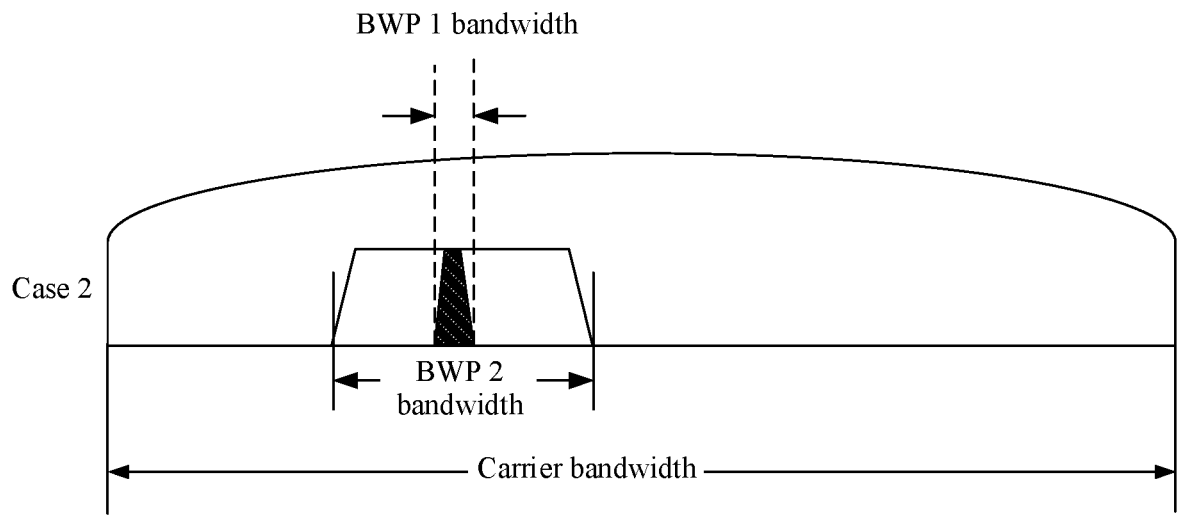
Figure 2C:
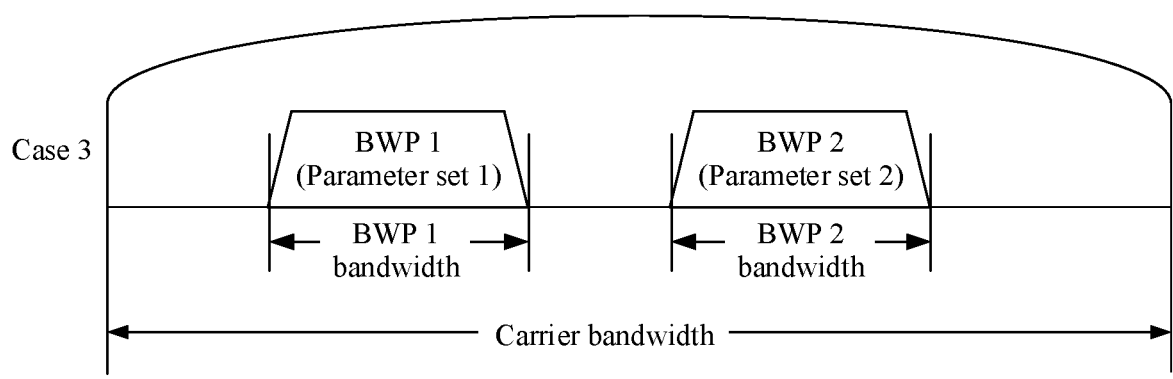

(7) A BWP is a segment of consecutive resources (for example, a group of consecutive RBs in a carrier bandwidth) configured for a terminal device in the carrier bandwidth to adapt to a bandwidth capability of the terminal device in an NR system. A plurality of BWPs may be configured in one carrier. For example, four BWPs may be configured in one carrier. A BWP in an active state is a currently available BWP. In addition, the bandwidth part may also be sometimes referred to as a carrier bandwidth part, a subband bandwidth, a narrowband bandwidth, or another name. The name is not limited in this application. FIG. 2a to FIG. 2c show three configuration cases of BWPs in a carrier bandwidth according to an embodiment of the application. FIG. 2a shows a case in which one BWP is configured in a carrier bandwidth. A network device may first allocate a BWP within a bandwidth capability range of a terminal device to the terminal device, and certainly may further allocate some or all resources in the BWP to the terminal device for data transmission. The network device may configure different BWPs for the terminal device based on actual scenarios. For example, to reduce power consumption of the terminal device, the network device may allocate a BWP to the terminal device based on a service volume of the terminal device. When the terminal device does not transmit service data or transmits only a small amount of service data, a relatively small BWP, such as a BWP 1 shown in FIG. 2b, may be allocated to the terminal device to receive control information and a small amount of data information. When the terminal device needs to transmit a large amount of service data, a relatively large bandwidth part, such as a BWP 2 shown in FIG. 2b, may be allocated to the terminal device. For another example, because a plurality of service types and communication scenarios may be supported in 5G, different parameters may be configured for the different service types and communication scenarios, and the network device may further allocate corresponding BWPs to the terminal device based on the different service types of the terminal device. As shown in FIG. 2c, one BWP may correspond to one service type. To meet a service requirement of the service type, a parameter set (numerology) that can meet the service requirement may be configured for the BWP. It can be learned from FIG. 2b that different BWPs may occupy partially overlapped frequency domain resources. It can be learned from FIG. 2c that different BWPs may alternatively occupy totally different frequency domain resources and use different numerologies. In embodiments of this application, the numerologies corresponding to the different BWPs may be the same or may be different. This is not limited in this application.

(8) A numerology is a parameter used in a communications system. The numerology may be defined by using one or more of parameters such as a subcarrier spacing, a cyclic prefix (CP), a time unit, and a bandwidth. An NR system may support a plurality of numerologies, and the plurality of numerologies may be used in a mixed manner. Referring to Table 1, Table 1 shows a numerology that can be currently supported in the NR system and that is defined by using the subcarrier spacing and the CP.

TABLE 1

| μ | Subcarrier spacing = $2^\mu \cdot 15$ (kHz) | Cyclic prefix |
|---|---|---|
| 0 | 15 | Normal |
| 1 | 30 | Normal |
| 2 | 60 | Normal or extended |
| 3 | 120 | Normal |
| 4 | 240 | Normal |

(9) A transport block (TB) is interface data between a medium access control (MAC) layer and a physical (PHY) layer. For example, one or more TBs may be exchanged between the MAC layer and the PHY layer. For example, one TB may include one or more bits.

(10) A code block (CB) is an input unit data block of channel coding, for example, the CB is used as a basic input unit for the channel coding. For example, one or more CBs may be obtained by segmenting data (for example, a TB to which a CRC is attached) corresponding to one TB. A maximum quantity of bits included in one CB usually varies with different channel coding schemes. For example, if a channel coding scheme is turbo encoding, a maximum CB length is 6144 bits. If a channel coding scheme is LDPC encoding, for an LDPC base graph 1, a maximum CB length is 8448 bits, and for an LDPC base graph 2, a maximum CB length is 3840 bits.

Figure 3A:
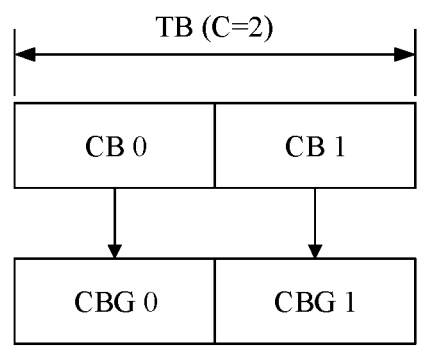
FIG. 3a and FIG. 3b are schematic diagrams of configuration of a CBG in a TB according to an embodiment of this application.
Figure 3B:
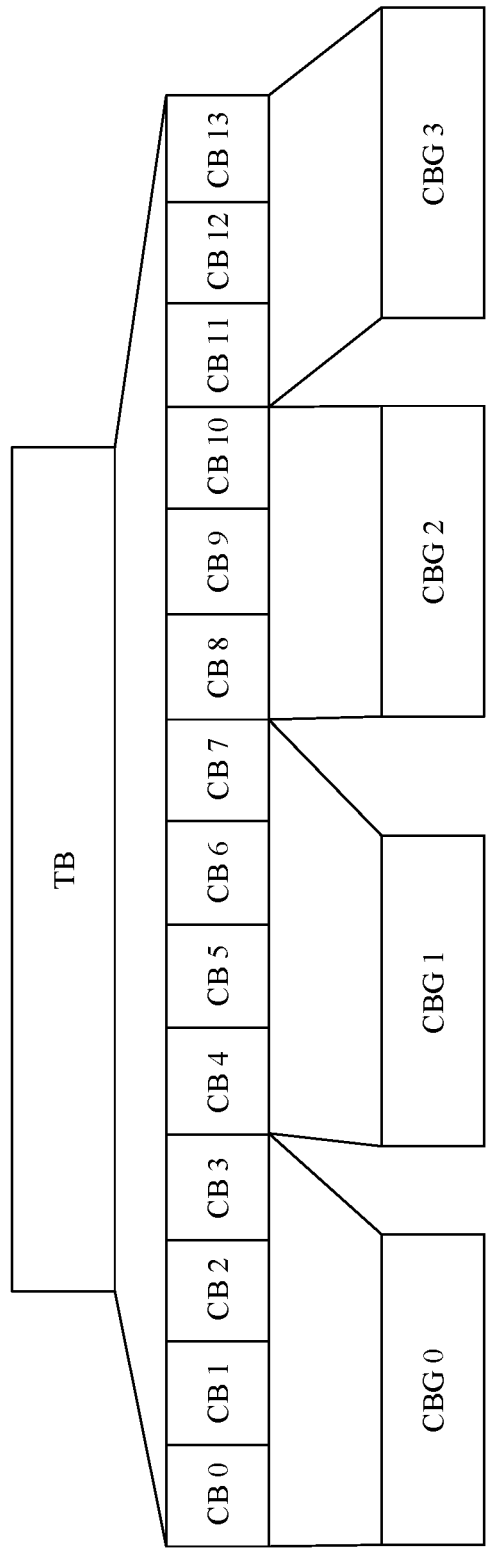

(11) Code block group (CBG): One CBG may correspond to one or more CBs. For example, one CBG means that a sending device obtains a group of consecutive code blocks based on a group of CBs with consecutive indexes. In other words, the group of CBs with the consecutive indexes may correspond to the CBG. For example, a maximum quantity of CBGs that may be obtained based on one TB may be configured by a network device for a terminal device by using radio resource control (RRC) signaling, and a final quantity A of CBGs corresponding to the TB depends on a quantity C of CBs obtained through segmenting data (for example, TB data to which a CRC is attached) corresponding to the TB and a maximum quantity B, configured by using RRC, of CBGs that may be included in the TB. In an embodiment, A, B, and C satisfy a formula: A=min(C, B), and D=mod(C, A), $$K_1 = \left\lceil \frac{C}{A} \right\rceil, \text{ and } K_2 = \left\lfloor \frac{C}{A} \right\rfloor$$

are defined. If D is greater than 0, for a CBG m whose index is m=0, 1, . . . , and D−1, the CBG corresponds to a CB whose index is m*$K_1$+k, where k=0, 1, . . . , and $K_1$−1; and for a CBG m whose index is m=D, D+1, . . . , and A−1, the CBG corresponds to a CB whose index is D*K+(m−D)*$K_2$+k, where k=0, 1, . . . , and $K_2$−1. FIG. 3a and FIG. 3b show two correspondences between a TB and CBGs according to an embodiment of the application. As shown in FIG. 3a, it is assumed that a quantity C of CBs obtained by segmenting data corresponding to one TB is 2, and a maximum quantity B, configured by using RRC, of CBGs that may be included in the TB is 4. FIG. 3a shows a correspondence between a TB and CBGs when C=2 and B=4. The data corresponding to the TB is segmented to obtain C=2 CBs, that is, a CB 0 and a CB 1. A final quantity A of CBGs is min (C, B)=min(2, 4)=2. The CB 0 and the CB 1 respectively correspond to two CBGs, that is, a CBG 0 and a CBG 1. In other words, one TB corresponds to two CBGs. In FIG. 3b, it is assumed that a quantity C of CBs obtained by segmenting data corresponding to one TB is 14, and a maximum quantity B, configured by using RRC, of CBGs that may be included in the TB is 4. FIG. 3b shows a correspondence between a TB and CBGs when C=14 and B=4. In this case, A=min(C, B)=min(14, 4)=4, $K_1$=4, and $K_2$=3. A CBG 0 corresponds to a CB 0, a CB 1, a CB 2, and a CB 3. A CBG 1 corresponds to a CB 4, a CB 5, a CB 6, and a CB 7. A CBG 2 corresponds to a CB 8, a CB 9, and a CB 10. A CBG 3 corresponds to a CB 11, a CB 12, and a CB 13. It should be noted that the CBG may be data including a group of CBs obtained based on the foregoing correspondence, or may be a combination of data obtained after channel coding processing is performed on the group of CBs, or may be a combination of data obtained after channel coding processing and rate matching processing are performed on the group of CBs. In the latter two possible cases, the CBG may also be referred to as an encoded CBG.

(12) A cell is described by a higher layer (for example, a protocol layer above a physical layer, such as a radio resource control (RRC) layer or a medium access control (MAC) layer from a perspective of resource management, mobility management, or a service unit. Coverage of each network device may be divided into one or more cells. One cell may be considered to include a frequency domain resource, in other words, one cell may include a carrier. The cell is a general name. For a terminal device, a cell that provides a service for the terminal device is referred to as a serving cell. The cell in this application may alternatively be a serving cell.

(13) In the descriptions of this application, unless otherwise specified, "a plurality of" means two or more, and another quantifier is similar to this. The term "and/or" describes an association relationship for describing associated objects and indicates that three relationships may exist. For example, A and/or B may indicate the following three cases: Only A exists, both A and B exist, and only B exists. The character "/" generally indicates an "or" relationship between the associated objects.

(14) Nouns "network" and "system" are usually interchangeably used, but meanings of the nouns can be understood by one of ordinary skilled in the art. Terms "information", "signal", "message", and "channel" may be interchangeably used sometimes. It should be noted that meanings expressed by the terms are consistent when differences of the terms are not emphasized. Terms "of", "corresponding (relevant)", and "corresponding" may be interchangeably used sometimes. It should be noted that meanings expressed by the terms are consistent when differences of the terms are not emphasized.

It should be noted that, in the descriptions of this application, words such as "first" and "second" are merely used for distinction and description, and should not be understood as an indication or implication of relative importance or an indication or implication of an order.

A data sending method and apparatus that are provided in the embodiments of this application may be used in a communications system. In the communications system, there is an entity for sending uplink data, an entity for sending downlink data, an entity for receiving uplink data, and an entity for receiving downlink data. For ease of description, in the embodiments of this application, an example in which the entity for sending downlink data is a network device, the entity for receiving downlink data is a terminal device, the entity for sending uplink data is the terminal device, and the entity for receiving uplink data is the network device is used for description, which is certainly not limited thereto.

Figure 4:
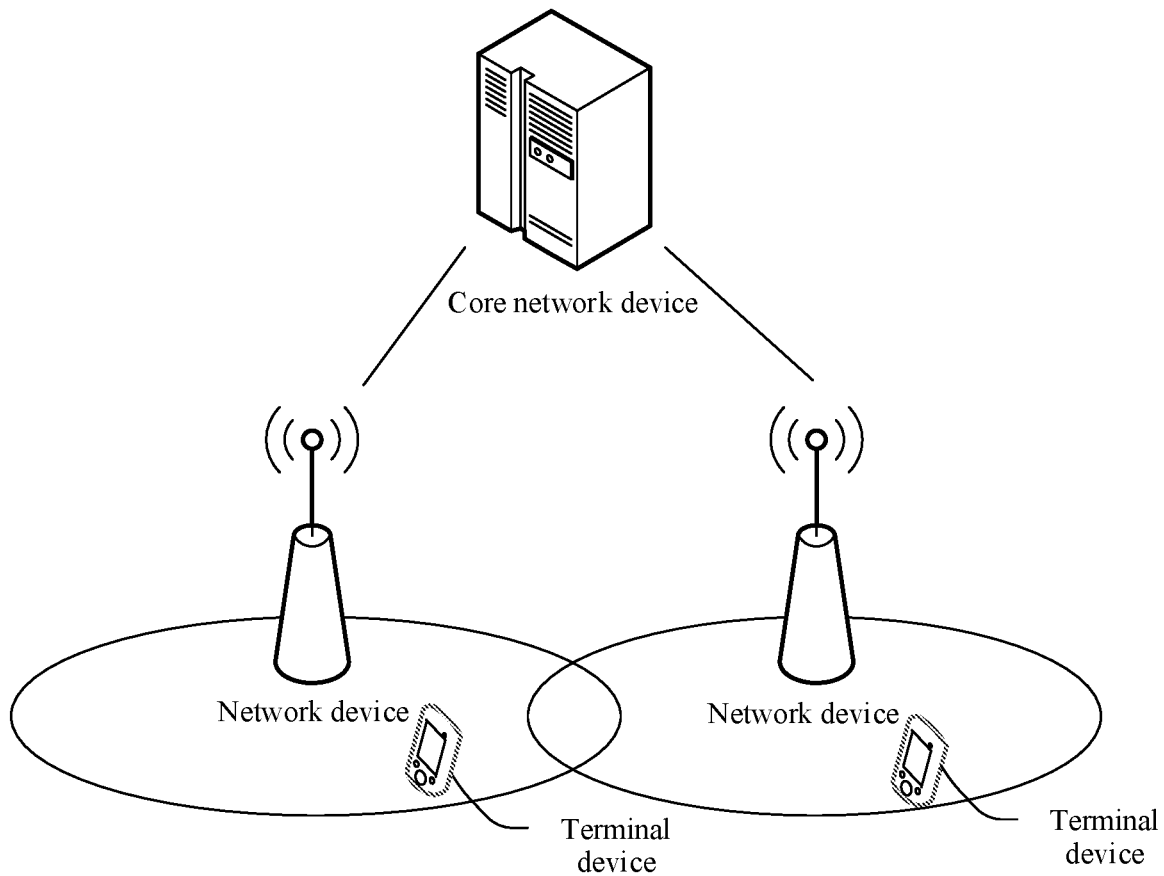
FIG. 4 is a schematic diagram of a network architecture to which embodiments of this application are applicable.

FIG. 4 is a schematic diagram of a network architecture to which embodiments of this application are applicable. As shown in FIG. 4, a terminal device may access a wireless network via a network device, to obtain a service of an external network (for example, the Internet) through the wireless network, or communicate with another terminal device through the wireless network. The wireless network includes the network device and a core network device, and the core network device is configured to: manage the terminal device and provide a gateway for communicating with the external network. It should be understood that an example in which only two network devices are included in the network architecture shown in FIG. 4 is used for description. However, the embodiments of this application are not limited thereto. For example, the network architecture may further include more network devices. Similarly, the network architecture may also include more terminal devices, and may further include another device.

It may be understood that the network architecture to which the solutions in the embodiments of this application are applied may be a 5G NR network architecture, or certainly, may be a network architecture newly added in the future. Corresponding names of the network device and the terminal device in the embodiments of this application may be names of corresponding functions in a wireless communications network. For example, in an NR system, the network device may be a gNB, a TRP, or the like, and the terminal device may be UE, an MS, or the like. In the embodiments of this application, the 5G NR network architecture is used as an example for description. Correspondingly, an example in which the network device is a gNB, and the terminal device is UE is used for description.

Figure 5:
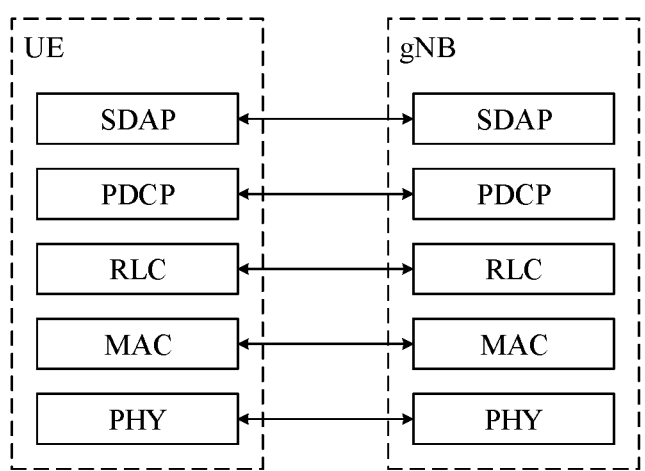
FIG. 5 is a schematic diagram of a user plane protocol stack between a gNB and UE.
Figure 6:
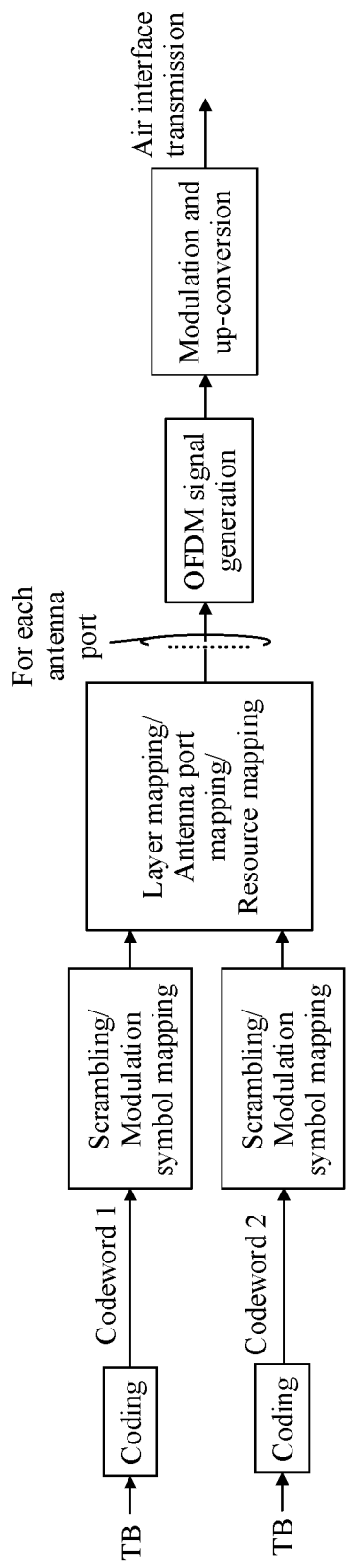
FIG. 6 is a schematic diagram of a processing procedure of sending data from a MAC layer to an air interface.

In the network architecture shown in FIG. 4, data may be transmitted between the network device (for example, the gNB) and the terminal device (for example, the UE) through an air interface. For example, the network device may send downlink data to the terminal device through the air interface. Correspondingly, the terminal device may receive, through the air interface, the downlink data sent by the network device. Certainly, the network device may also receive, through the air interface, uplink data sent by the terminal device. Correspondingly, the terminal device may send the uplink data to the network device through the air interface. In the embodiments of this application, an example in which the network device sends data to the terminal device through the air interface is used for description. It may be understood that the method and the apparatus that are provided in the embodiments of this application are also applicable to a case in which the terminal device sends data to the network device through the air interface. Before sending the data to the terminal device through the air interface, the network device needs to perform related processing on the to-be-sent data. FIG. 5 is a schematic diagram of a user plane protocol stack between a gNB and UE. Before sending data to the UE through an air interface, the gNB performs data processing of corresponding layers at different protocol layers. For example, service adaptation is performed on the to-be-sent data at a service data adaptation protocol (SDAP) layer, and mapping from a logical channel to a transmission channel is implemented at a MAC layer. Interface data between the MAC layer and a PHY layer is referred to as a TB. The embodiments of this application mainly relate to a processing procedure from the TB output from the MAC layer to data sent through the air interface. FIG. 6 may be a schematic diagram of a processing procedure from a TB output from a MAC layer to data sent through an air interface in an LTE cell and an NR Rel-15 cell. In FIG. 6, one TB may be input at an input end. When a multiple input multiple output (MIMO) technology is used, two TBs may be input. When the two TBs are input, the two TBs may be sent on a same time-frequency resource at the same time. For ease of description and understanding, only a non-MIMO case is described below in this application. It may be understood that, after the MIMO technology is used, one TB in this application may be replaced with two TBs, and data corresponding to the two TBs may be sent on a same time-frequency resource. In consideration of translation accuracy, for English names of corresponding modules in FIG. 6 of this application, refer to Table 2.

TABLE 2

| English module name | Function |
| --- | --- |
| Coding | Redundant information is added to to-be-sent information (for example, data), so that after receiving a signal, a receiving device can perform forward error correction (FEC) by using the redundant information in channel coding. For example, when the FEC is performed, a sending device encodes an input bit to obtain an encoded output bit, so that the receiving device can detect a bit error or can correct a bit error, thereby |

TABLE 2-continued

| English module name | Function |
| --- | --- |
| | improving data transmission reliability. When the FEC is performed, the input bit may be encoded by using a forward error correcting code commonly used in this technical field. The commonly used forward error correcting code may be a convolutional code, a block code, a turbo code, an LDPC (Low density parity check) code, or a polar code. (Note: Coding herein is channel coding in a broad sense, which is distinguished from channel coding in a narrow sense.) |
| Scrambling | When the scrambling is performed, an encoded output bit sequence is scrambled by using a scrambling sequence, to obtain a scrambled output bit sequence. For example, that the encoded output bit sequence is scrambled by using the scrambling sequence may include: adding the scrambling sequence to the encoded output bit sequence, or multiplying the scrambling sequence by the encoded output bit sequence. |
| Modulation mapper | The sending device may obtain a modulation symbol after modulating a scrambling bit according to a modulation mechanism. For example, the modulation mechanism may include quadrature amplitude modulation (QAM), and the QAM modulation may include at least one of binary phase shift keying (BPSK), quadrature phase shift keying (QPSK), 16QAM, 64QAM, 256 QAM, and 1024 QAM. |
| Layer mapper (or mapping) | Data is mapped to a plurality of layers of spatial multiplexing (non-spatial multiplexing is equivalent to a single layer). |
| Antenna port mapping | Data is mapped to a corresponding antenna port. |
| Resource mapper | Information is mapped to a resource element used to send a signal. |
| OFDM signal generation | An OFDM signal is generated. |
| Modulation and up-conversion | The to-be-sent signal is modulated and up-converted to a center frequency for sending a final signal. |

Figure 7:
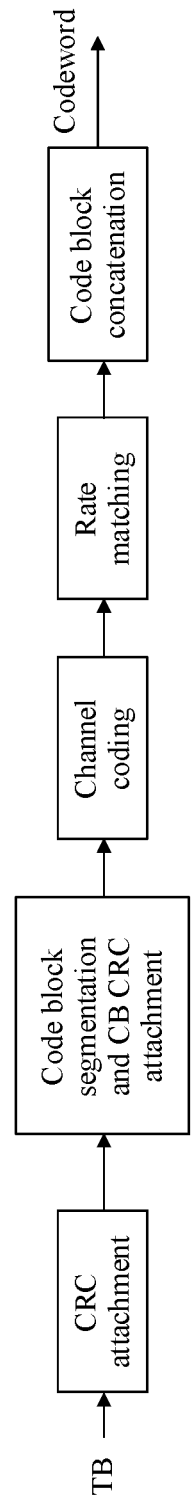
FIG. 7 is a schematic diagram of dividing a coding module into a plurality of submodules.

A coding module indicates a coding process, which is channel coding in abroad sense, and may be further divided into a plurality of submodules. FIG. 7 is a schematic diagram of dividing a coding module into a plurality of submodules. Similarly, in consideration of translation accuracy, for English names of corresponding modules in a protocol used in FIG. 7 of this application, refer to Table 3.

TABLE 3

| English module name | Function |
| --- | --- |
| CRC attachment | This is used to determine whether a TB is correctly received. For example, a CRC attachment method may be the method described in section 5.3.2.1 of the LTE standard protocol 36.212, or in section 7.2.1 of the 5G standard protocol 38.212. |
| CB segmentation and CB CRC attachment | The CB CRC attachment is used to determine whether a CB is correctly received. For example, a CB segmentation and CB CRC attachment method may be the method described in section 5.3.2.2 of the LTE standard protocol 36.212, or in section 7.2.3 of the 5G standard protocol 38.212. |
| Channel coding | Forward coding is performed to avoid a possible error in a sending process, and redundant information is generated, so that a receiving device can determine whether received data is correct. For example, a method related to the channel coding may be the method described in section 5.3.2.3 of the LTE standard protocol 36.212, or in section 7.2.4 of the 5G standard protocol 38.212. |
| Rate matching | A bit obtained after the channel coding is |

TABLE 3-continued

| English module name | Function |
|---|---|
| | retransmitted (repeated) or punctured to match a bearer capability of a physical channel. For example, a method related to the rate matching may be the method described in section 5.3.2.4 of the LTE standard protocol 36.212, or in section 7.2.5 of the 5G standard protocol 38.212. |
| CB concatenation | A plurality of CBs obtained by segmenting data corresponding to one TB are combined after the channel coding and the rate matching, to form codeword data. For example, a method related to the code block concatenation may be the method described in section 5.3.2.5 of the LTE standard protocol 36.212, or in section 7.2.6 of the 5G standard protocol 38.212. |

In a possible design, the sending device needs to perform the channel coding on the TB before sending the data. The sending device may segment the data corresponding to the TB into the plurality of CBs before performing the channel coding. After the channel coding and the rate matching are separately performed on the plurality of CBs, the plurality of CBs are combined through the code block concatenation to form a data stream corresponding to the TB, namely, a codeword or codeword data, and then the data corresponding to the TB is sent through the air interface in one BWP in one carrier. If frequency selective fading occurs on a frequency resource corresponding to the BWP, a sending error of the entire TB is caused. Consequently, data transmission accuracy is reduced, and then data transmission efficiency is reduced.

Based on the foregoing existing problem, an embodiment of this application provides a data sending method, to map at least two data parts of one TB to a plurality of different BWPs in one carrier, or respectively map at least two data parts of one TB to a plurality of different BWPs in a plurality of carriers. In the method, an advantage of a frequency diversity can be utilized, and a same TB can be sent by using a plurality of discrete frequency resources (for example, BWPs). Because a probability that all data parts sent on different frequency resources fall into fading is relatively low, a probability that all data parts included in one TB are incorrectly sent is relatively low. Therefore, according to the method, data transmission accuracy can be improved, and then data transmission efficiency can be improved. In the embodiments of this application, at least two may be two, three, four, or more than four, and at least one may be one, two, three, four, or more than four.

Figure 8A:
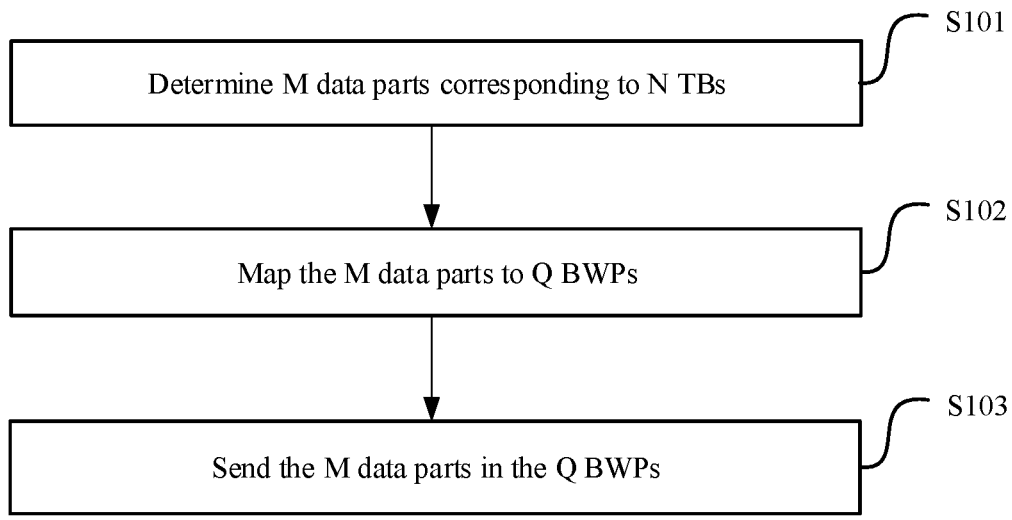
FIG. 8a and FIG. 8b are implementation flowcharts of a data sending method according to an embodiment of this application.

FIG. 8a is an implementation flowchart of a data sending method according to an embodiment of this application. As shown in FIG. 8a, the method includes the following operations.

S101: Determine M data parts corresponding to N TBs. N is an integer greater than or equal to 1, and M is an integer greater than or equal to 2.

In the embodiments of this application, the method may be performed by a sending device or a communications apparatus (for example, a chip system) that can support a sending device in implementing the method. In this application, an example in which the sending device performs the method is used for description. The sending device may be a network device or a terminal device. In this case, operations S101 to S103 may all be performed by the sending device.

When N is equal to 1, the sending device may perform S101 to determine M data parts corresponding to one TB.

When N is an integer greater than 1, the sending device may perform S101 to determine the M data parts corresponding to the N TBs, which may mean that a total of M data parts corresponding to the N TBs are determined. For example, it is assumed that there is a first TB and a second TB, and a quantity M of data parts corresponding to the two TBs is 4. The first TB may correspond to two data parts, and the second TB may correspond to the other two data parts. Alternatively, the first TB may correspond to three data parts, and the second TB may correspond to the other data part. For another example, it is assumed that there is a first TB and a second TB, and a quantity M of data parts corresponding to the two TBs is 5. The first TB may correspond to three data parts, and the second TB may correspond to the other two data parts.

S102: Map the M data parts to Q BWPs. Q is an integer greater than or equal to 2, Q is less than or equal to M, one of the N TBs corresponds to at least two data parts, and the at least two data parts are respectively mapped to different BWPs.

In the embodiments of this application, any two of the Q BWPs may be BWPs in a same carrier, or may be BWPs in different carriers. The different carriers may belong to one cell, or may belong to different cells. This is not limited in this application. In this application, all BWPs to which data parts are to be mapped may be active BWPs in a carrier.

When N is equal to 1, after performing S102, the sending device may map the M data parts corresponding to the TB to the Q BWPs. When Q is equal to M, after performing S102, the sending device may map, in a one-to-one correspondence, the M data parts corresponding to the TB to the Q BWPs.

Figure 9A:
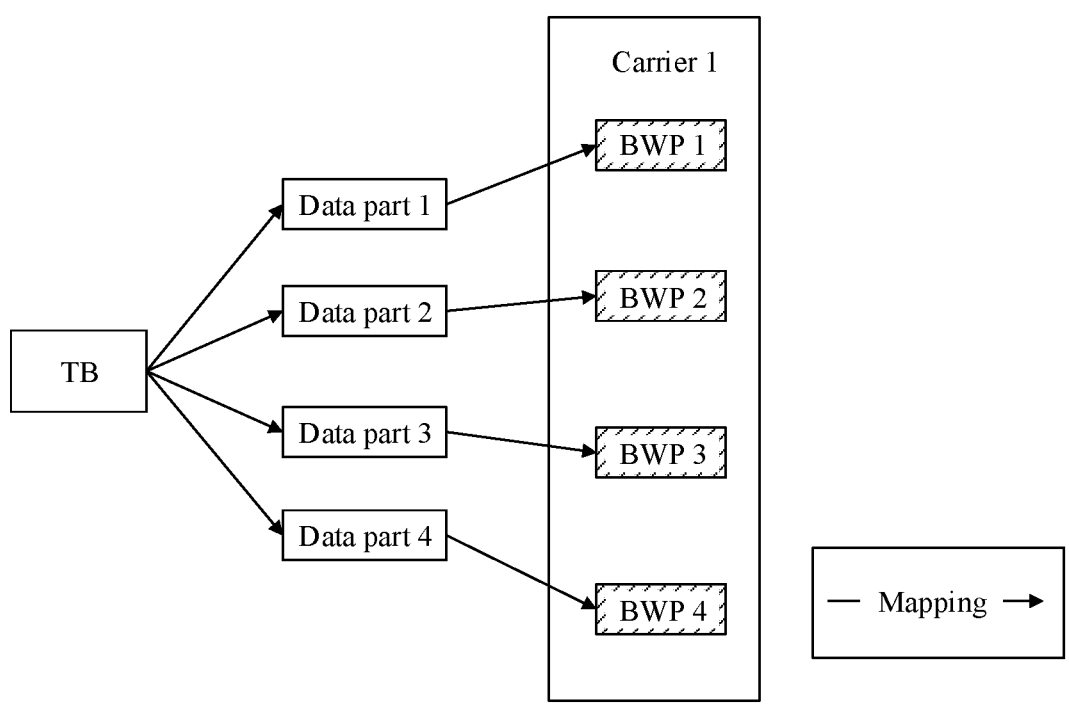
FIG. 9a to FIG. 9f are schematic diagrams of mapping data parts corresponding to one TB to BWPs.
Figure 9B:
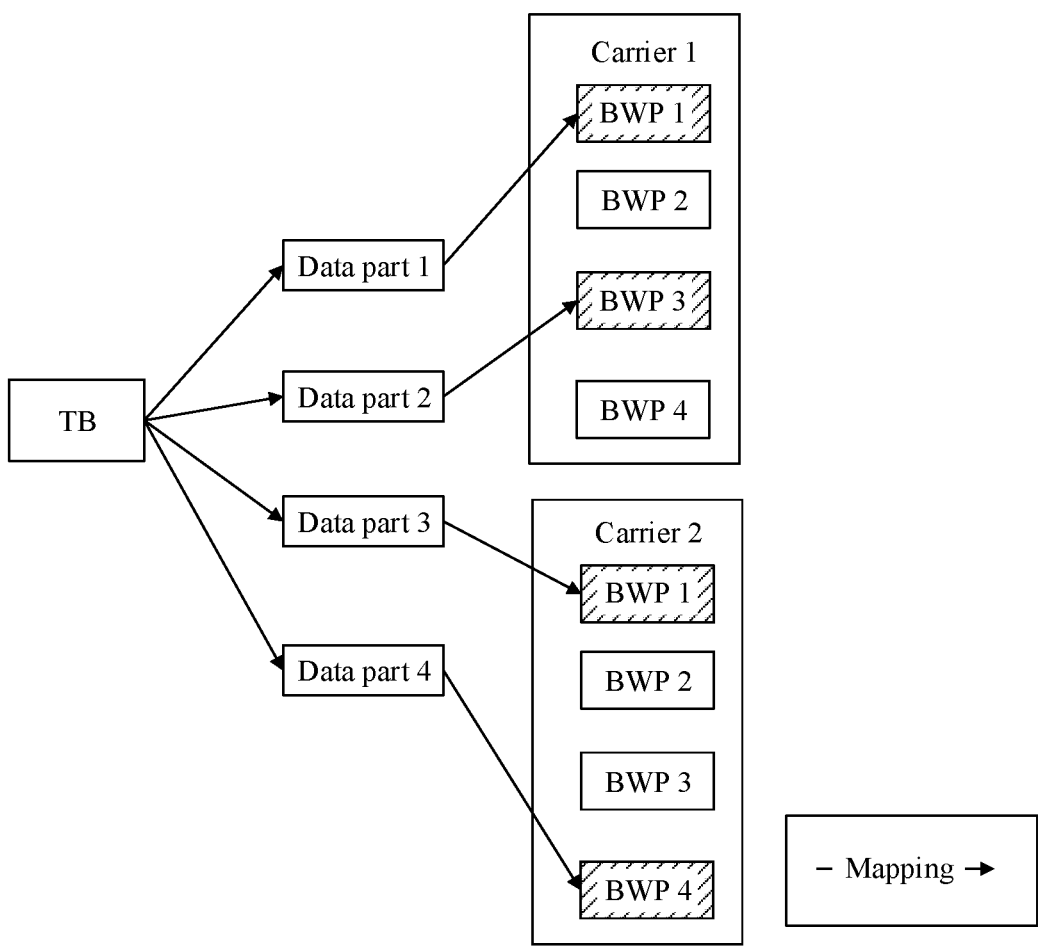
Figure 9C:
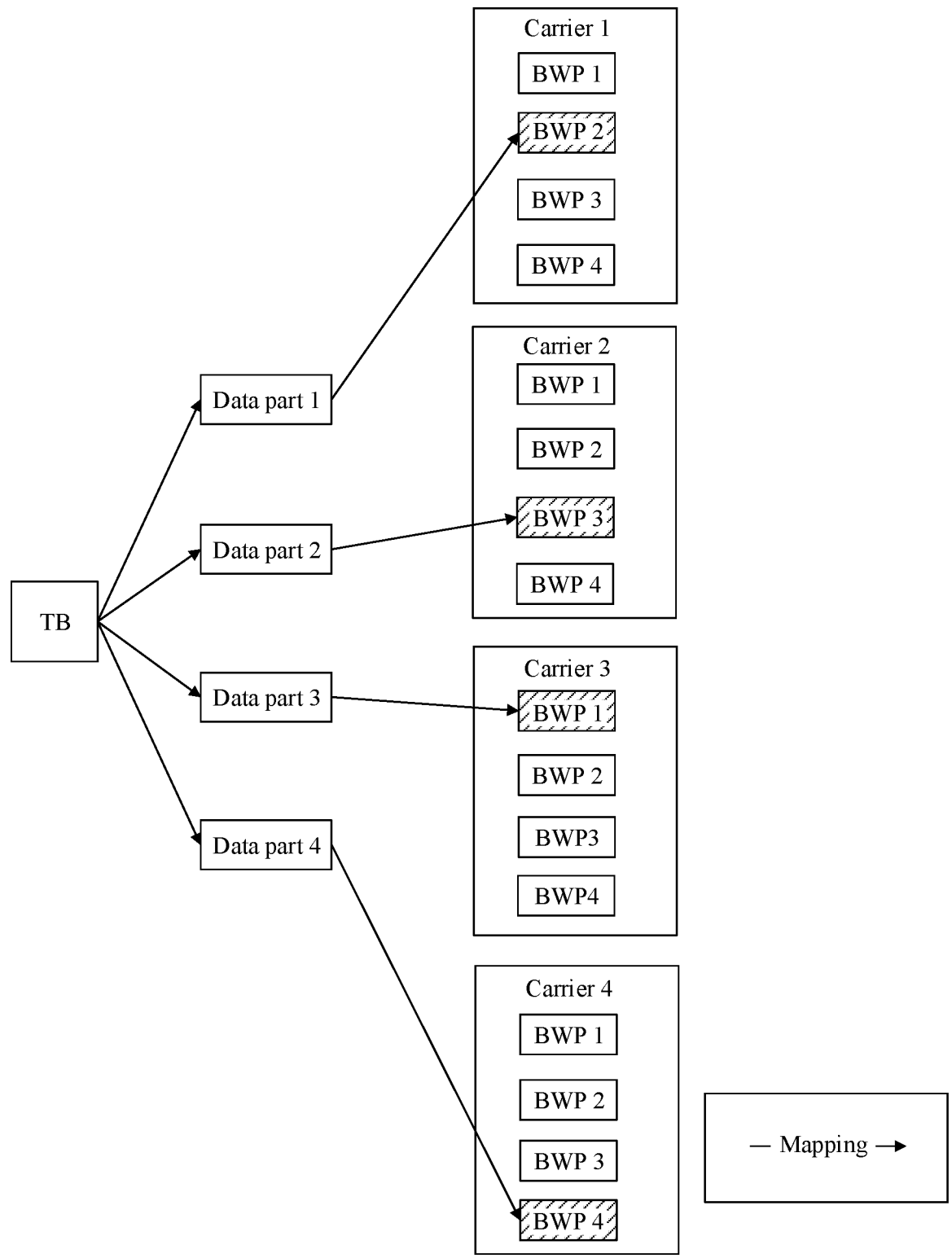

FIG. 9a to FIG. 9c are schematic diagrams of mapping, in a one-to-one correspondence, M data parts corresponding to one TB to Q BWPs. In FIG. 9a, it is assumed that Q is equal to M and is equal to 4. For example, there are four active BWPs in this case, in this application, BWPs to which the data parts are mapped are identified by using shadows in the accompanying drawings, and it is assumed that the four BWPs are all BWPs in a same carrier. For ease of description, the four data parts corresponding to the TB are denoted as a data part 1, a data part 2, a data part 3, and a data part 4. The four data parts are mapped to the four BWPs in a one-to-one correspondence. In FIG. 9b and FIG. 9c, it is assumed that Q is equal to M and is equal to 4, and it is assumed that at least two of the four BWPs are BWPs in different carriers. FIG. 9a to FIG. 9c are merely possible examples, and impose no limitation. The four data parts corresponding to the TB may be mapped to BWPs in any quantity of different carriers. For example, the four data parts corresponding to the TB may alternatively be mapped to BWPs in three different carriers.

Figure 9D:
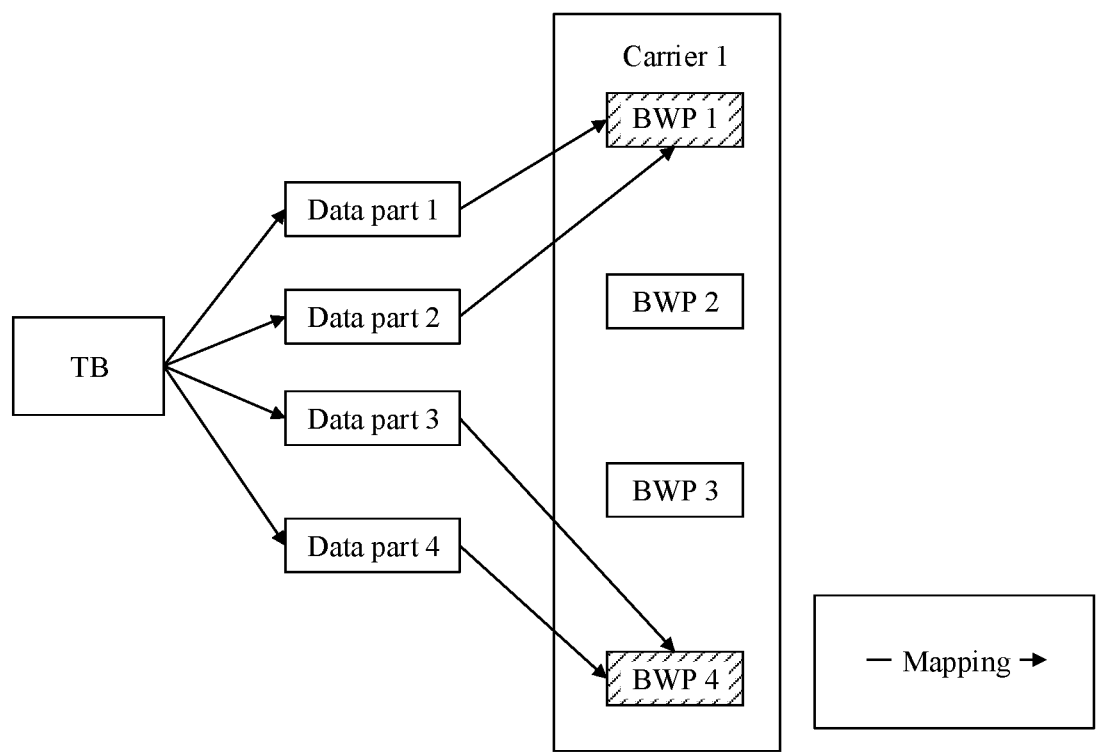
Figure 9E:
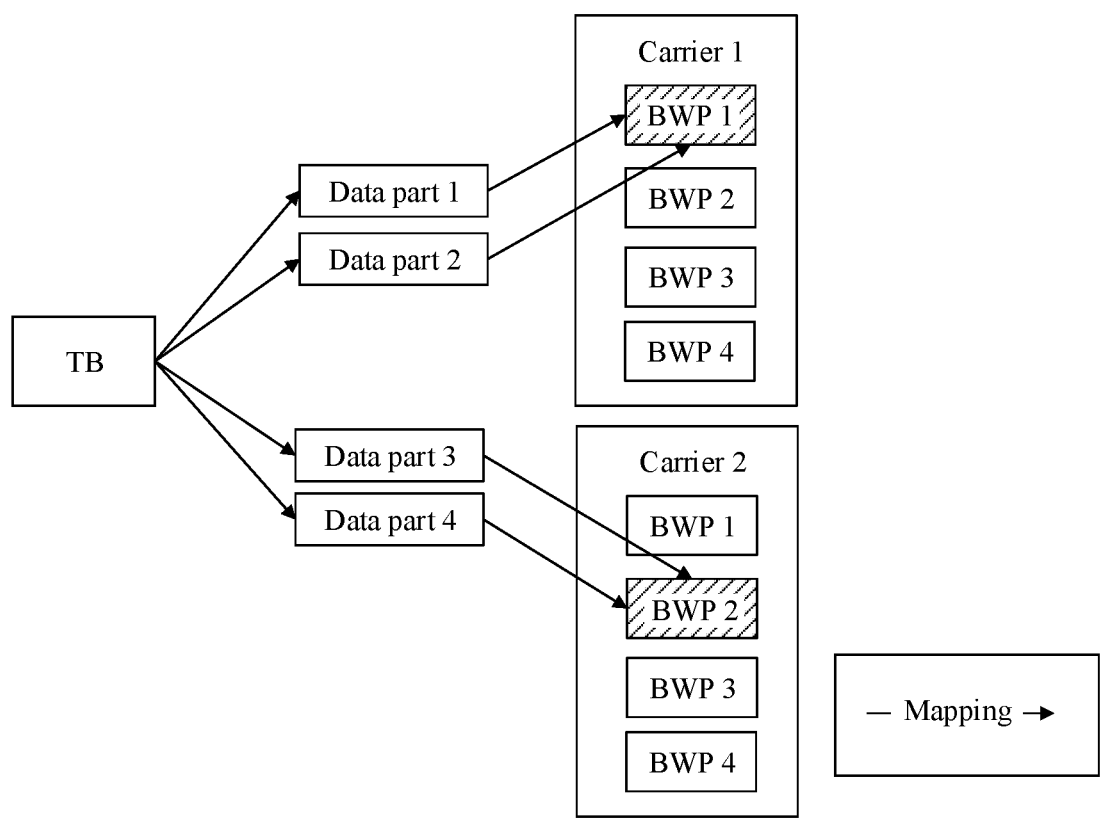
Figure 9F:
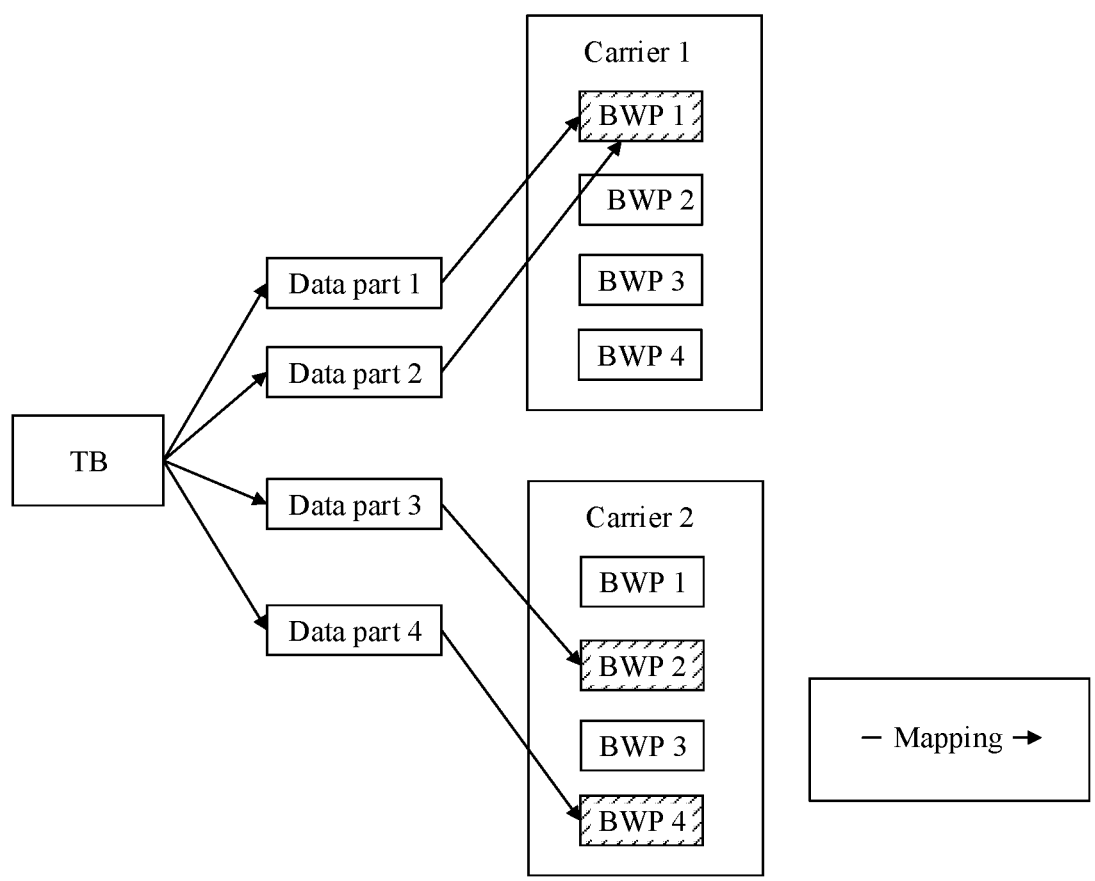

When Q is an integer less than M, a plurality of data parts are mapped to at least one BWP. For example, when M is 4 and Q is 3, two data parts are mapped to one BWP. FIG. 9d to FIG. 9f are other schematic diagrams of mapping M data parts corresponding to one TB to Q BWPs. In FIG. 9d, it is assumed that Q is less than M, a value of Q is 2, and a value of M is 4. In addition, it is assumed that the two BWPs are BWPs in a same carrier. In this case, the four data parts corresponding to the TB may be mapped to the two BWPs. As shown in FIG. 9d, the four data parts may be evenly mapped to the two BWPs. Alternatively, three data parts may be mapped to one BWP, and one data part may be mapped to the other BWP. FIG. 9d is merely a possible example, and imposes no limitation. In FIG. 9e, it is assumed that Q is less than M, a value of Q is 2, and a value of M is 4. In addition, it is assumed that the two BWPs are BWPs in different carriers. In this case, the four data parts corresponding to the TB may be mapped to the two BWPs in two carriers. As shown in FIG. 9e, the four data parts may be evenly mapped to the two BWPs in the two carriers. Alternatively, three data parts may be mapped to one BWP in one carrier, and one data part may be mapped to one BWP in the other carrier. FIG. 9e is merely a possible example, and imposes no limitation. In FIG. 9f, it is assumed that Q is less than M, a value of Q is 3, and a value of M is 4. In addition, it is assumed that two BWPs are BWPs in a same carrier, and the other BWP is a BWP in a different carrier. In this case, the four data parts corresponding to the TB may be mapped to the three BWPs. As shown in FIG. 9f, two data parts may be mapped to a same BWP in a carrier 1, and the other two data parts may be respectively mapped to two BWPs in a carrier 2. FIG. 9f is merely a possible example, and imposes no limitation.

It should be understood that, in FIG. 9a to FIG. 9f and the following examples, an example in which one carrier includes four BWPs is used for description. In actual application, one carrier may include another quantity of BWPs. This is not limited in this application.

It should be noted that, in an embodiment of this application, to facilitate understanding of the solutions of this application, a carrier and a BWP are numbered. In actual application, the carrier and the BWP may be numbered from zero, or certainly, may be numbered from another number. This is not limited in this application.

It should be further noted that when sending a plurality of TBs, the sending device may send the plurality of TBs by using a method that is the same as the foregoing method for sending one TB. Parameters corresponding to different TBs, for example, M and Q, may be the same or may be different. This is not limited in this application.

Figure 10A:
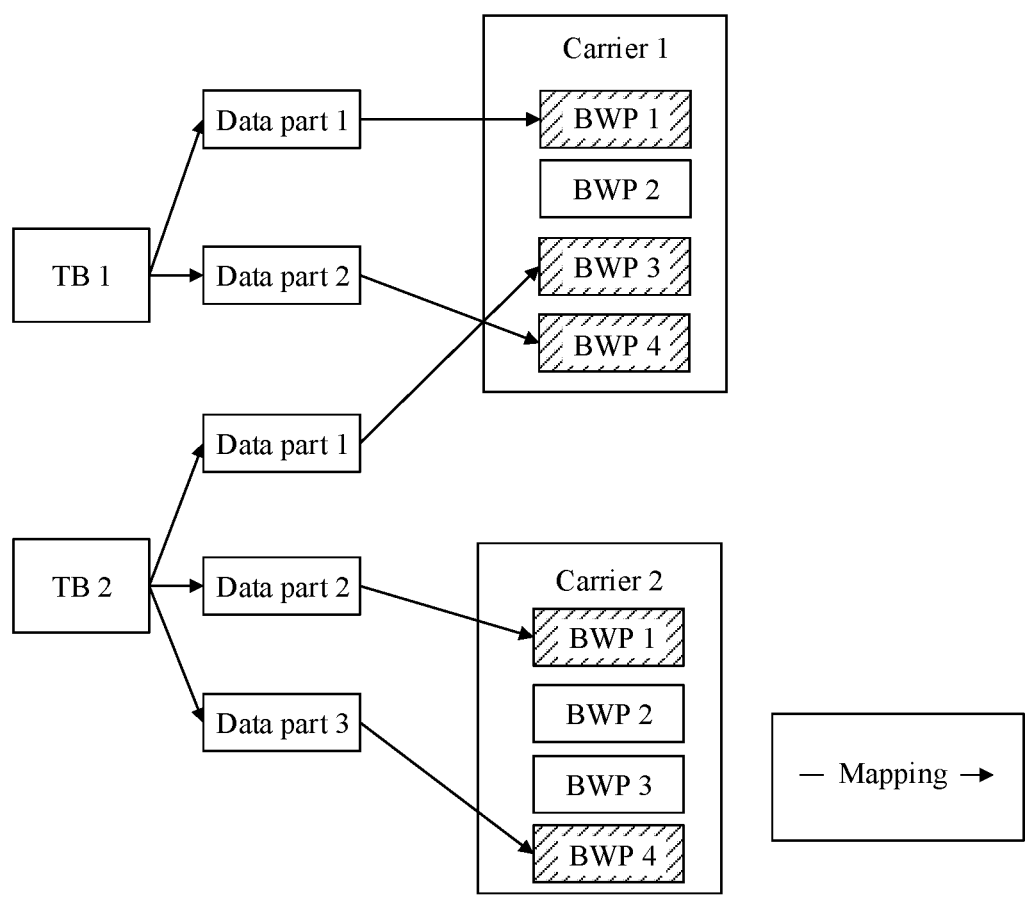
FIG. 10a to FIG. 10e are schematic diagrams of mapping data parts corresponding to two TBs to BWPs.
Figure 10B:
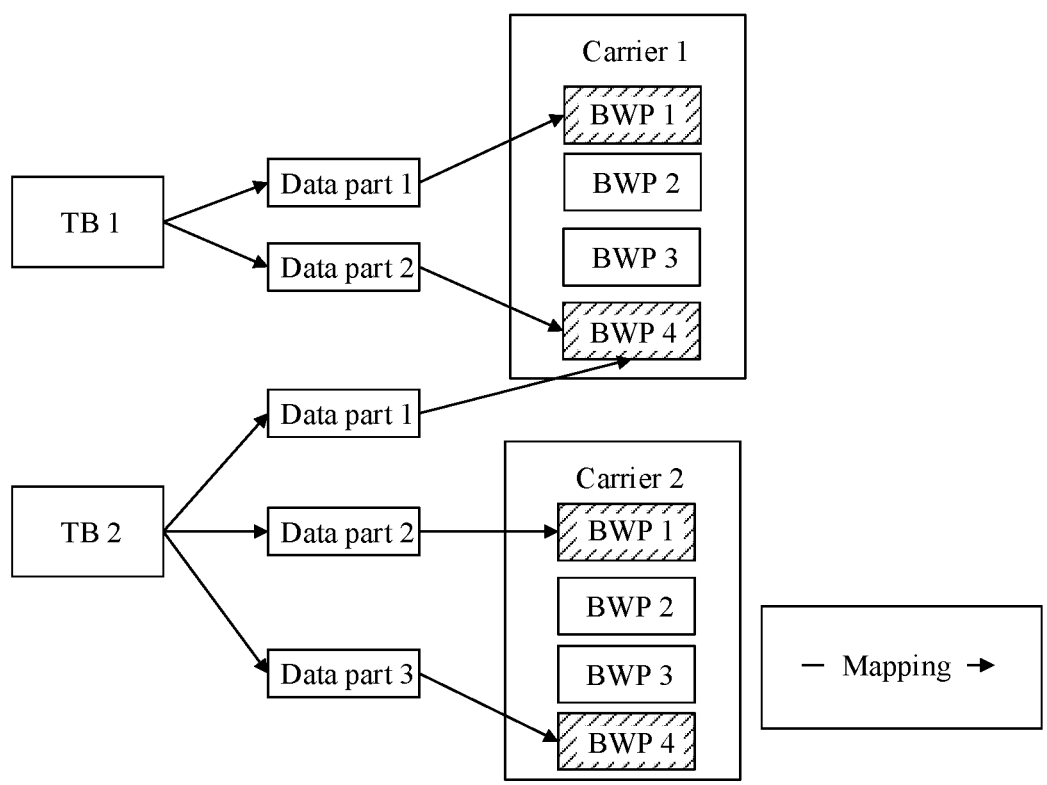
Figure 10C:
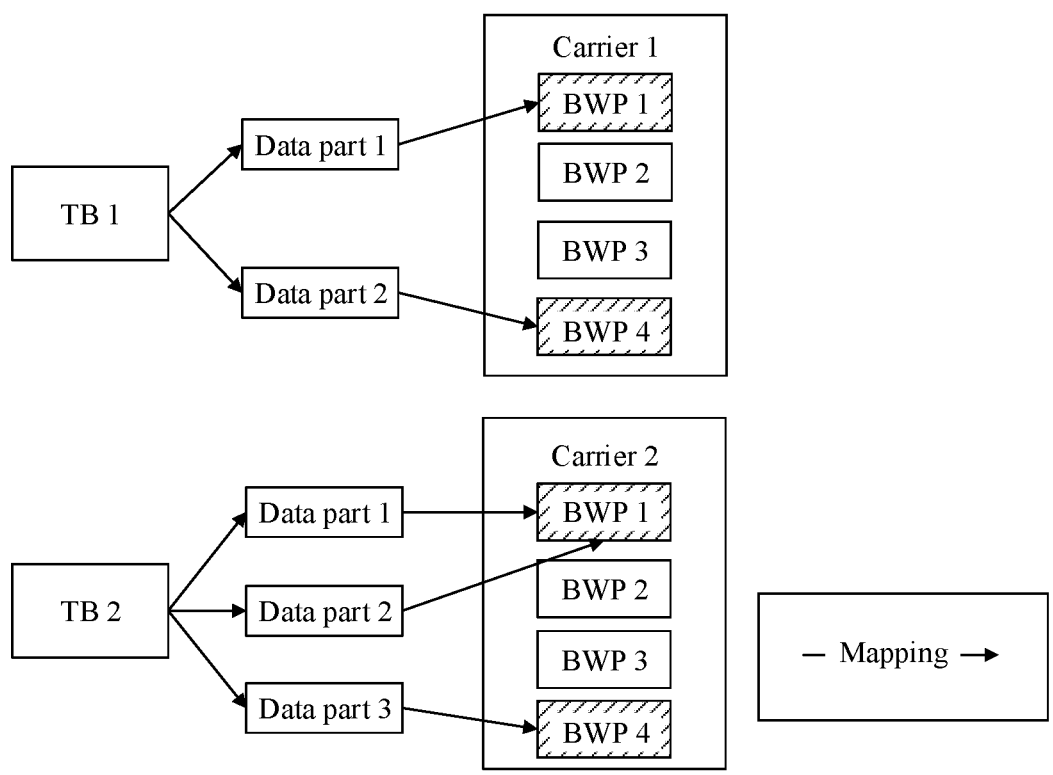

When N is an integer greater than 1, after performing S102, the sending device may map the M data parts to the Q BWPs, which means that the total of M data parts corresponding to the N TBs are mapped to the Q BWPs. For example, it is assumed that N is 2, for example, the two TBs are denoted as a TB 1 and a TB 2 respectively, and a total quantity M of data parts corresponding to the two TBs is 5. If it is determined in S101 that the TB 1 corresponds to two data parts and the TB 2 corresponds to three data parts, and it is assumed that Q is equal to M and is equal to 5, the five data parts corresponding to the TB 1 and the TB 2 may be respectively mapped to the five BWPs in S102. As shown in FIG. 10a, a data part 1 and a data part 2 that correspond to the TB 1 may be respectively mapped to a BWP 1 and a BWP 4 in a carrier 1. A data part 1, a data part 2, and a data part 3 that correspond to the TB 2 may be respectively mapped to a BWP 3 in the carrier 1, a BWP 1 in a carrier 2, and a BWP 4 in the carrier 2. Another mapping manner may alternatively be used. FIG. 10a is merely a possible example, and imposes no limitation. For another example, it is still assumed that N is 2, for example, a TB 1 and a TB 2 are to be sent, the TB 1 corresponds to two data parts, and the TB 2 corresponds to three data parts. In this case, it is assumed that Q is an integer less than M. For example, Q is 4. In S102, two data parts may be mapped to a same BWP. The data parts mapped to the same BWP may be data parts of a same TB, or may be data parts of different TBs. Refer to FIG. 10b and FIG. 10c. In FIG. 10b, a data part 1 and a data part 2 that correspond to the TB 1 are respectively mapped to a BWP 1 and a BWP 4 in a carrier 1, and a data part 1, a data part 2, and a data part 3 that correspond to the TB 2 are respectively mapped to the BWP 4 in the carrier 1, a BWP 1 in a carrier 2, and a BWP 4 in the carrier 2. In other words, data parts of different TBs (the TB 1 and the TB 2) are mapped to a same BWP in FIG. 10b. In FIG. 10c, a data part 1 and a data part 2 that correspond to the TB 1 are respectively mapped to a BWP 1 and a BWP 4 in a carrier 1, and a data part 1, a data part 2, and a data part 3 that correspond to the TB 2 are respectively mapped to a BWP 1 and a BWP 4 in a carrier 2. In other words, two data parts of a same TB (the TB 2) are mapped to a same BWP in FIG. 10c. Certainly, another mapping manner may alternatively be used. For example, the three data parts corresponding to the TB 2 may be respectively mapped to three different BWPs, and the two data parts corresponding to the TB 1 are mapped to a same BWP. FIG. 10b and FIG. 10c are merely possible examples, and impose no limitation.

S103: Send the M data parts in the Q BWPs. A receiving device may receive the M data parts in the corresponding Q BWPs.

It should be noted that when the sending device is a terminal device, before sending the M data parts, the terminal device may determine, by receiving first information from a network device, BWPs in which the M data parts are sent. The first information includes at least one of RRC configuration information, a dynamic downlink control information (DCI) indication, and a MAC control element (MAC CE) indication.

Figure 8B:
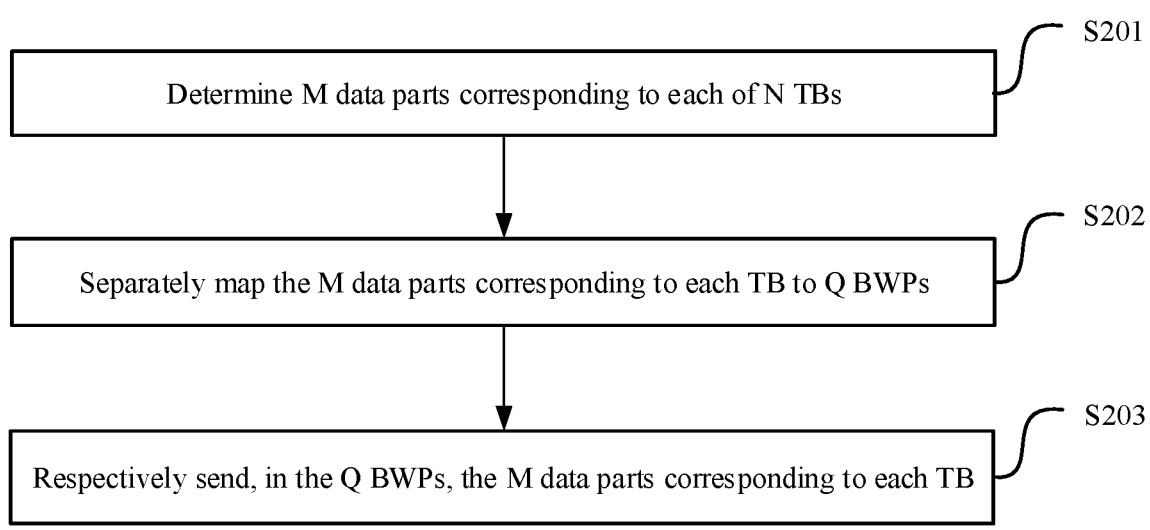

FIG. 8b is an implementation flowchart of another data sending method according to an embodiment of this application. As shown in FIG. 8b, the method includes the following operations.

S201: Determine M data parts corresponding to each of N TBs. N is an integer greater than or equal to 1, and M is an integer greater than or equal to 2.

When N is equal to 1, a sending device may perform S201 to determine M data parts corresponding to one TB.

When N is an integer greater than 1, the sending device may perform S201 to determine the M data parts corresponding to each of the N TBs. For example, it is assumed that N is 2, and the N TBs include a first TB and a second TB. The sending device may perform S201 to determine M data parts corresponding to each of the first TB and the second TB.

It should be noted that quantities of data parts corresponding to TBs may be the same or may be different. For example, M corresponding to the TBs may be the same or may be different.

S202: Respectively map the M data parts corresponding to each TB to Q BWPs. Q is an integer greater than or equal to 2, and Q is less than or equal to M.

When N is equal to 1, for S202, refer to an execution process of S102. Details are not described herein again.

Figure 10D:
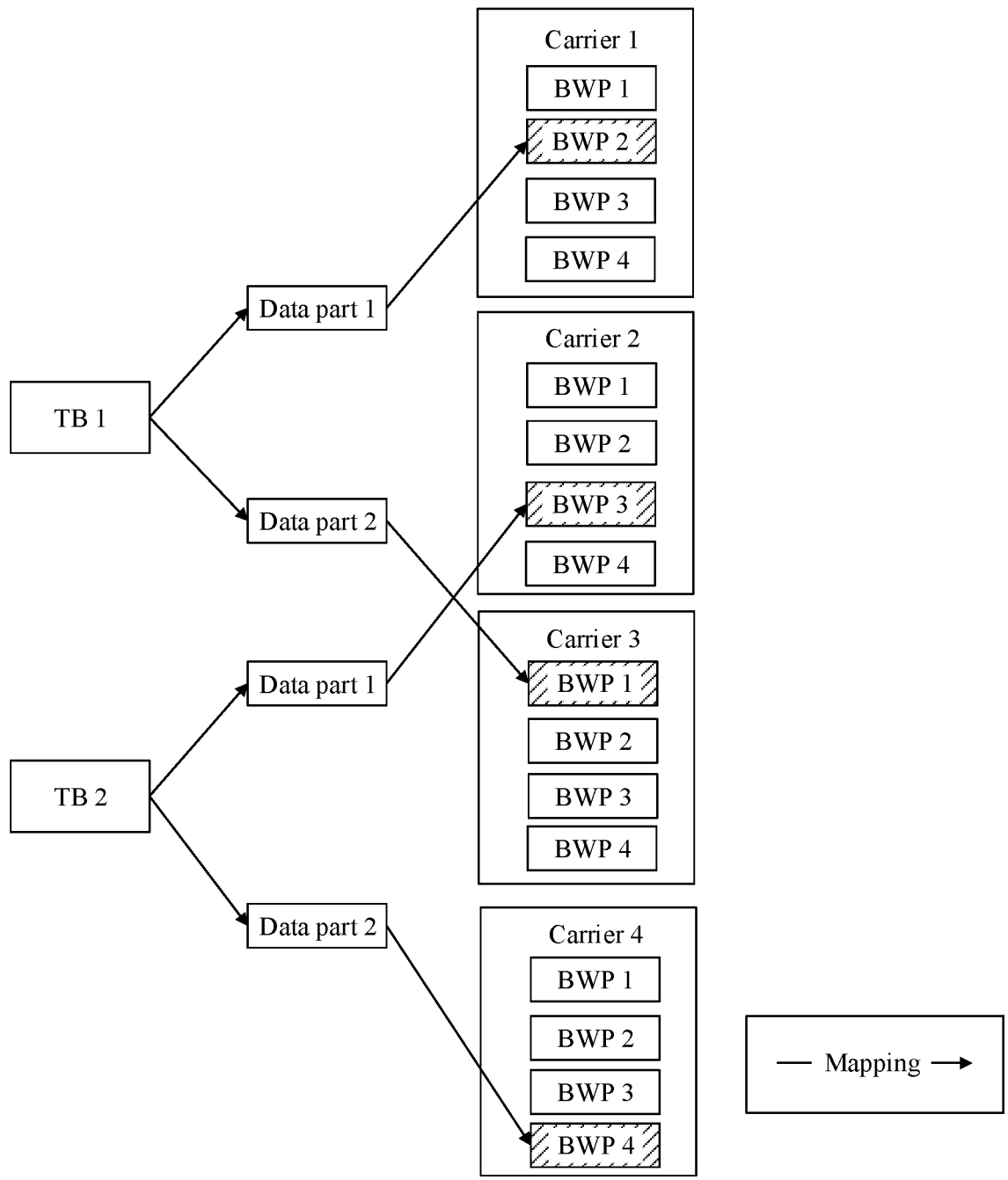
Figure 10E:
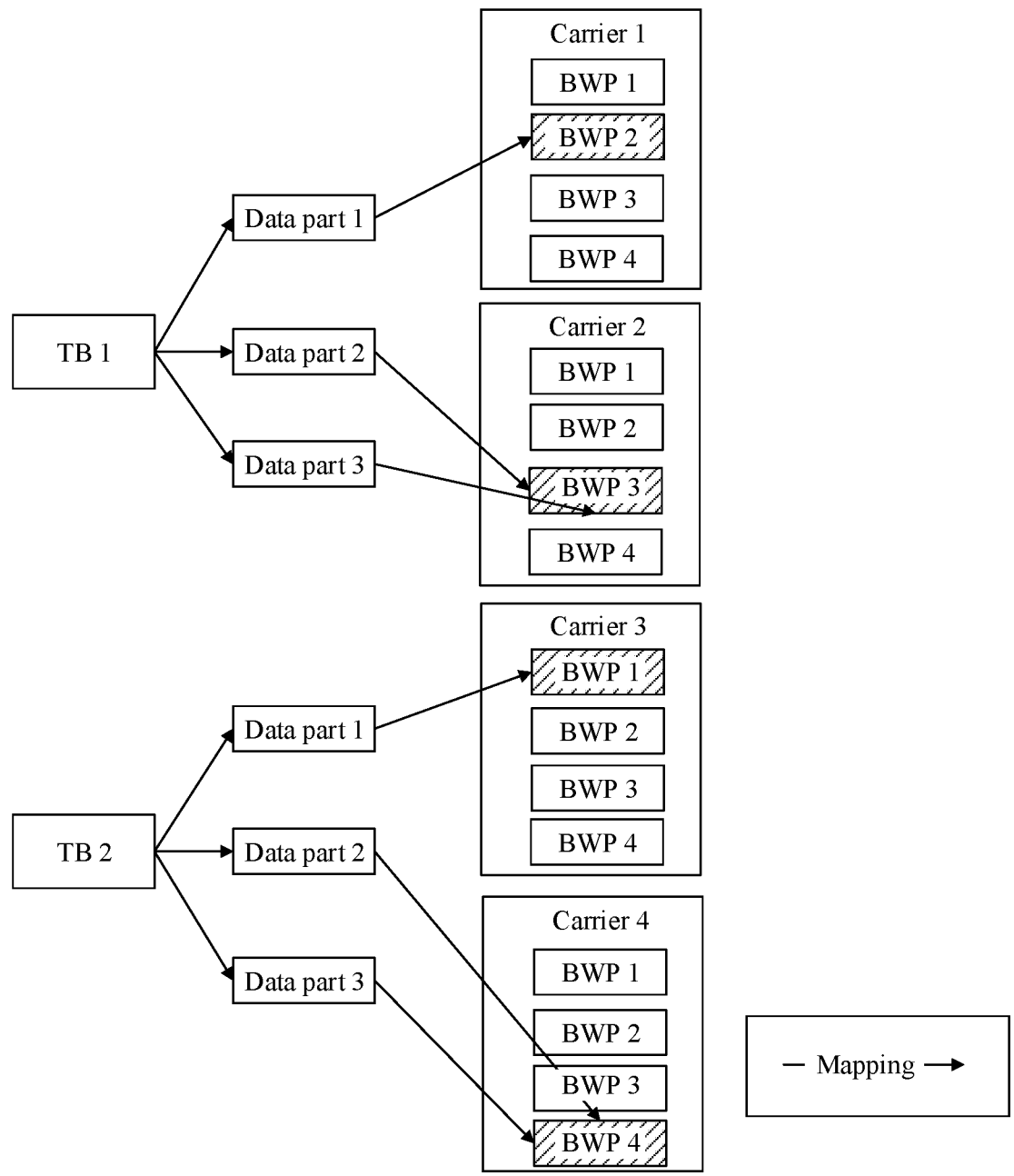

When N is an integer greater than 1, after performing S202, the sending device may respectively map the M data parts corresponding to each TB to the Q BWPs. For example, it is assumed that N is 2 and Q is 2, for example, the two TBs are denoted as a TB 1 and a TB 2 respectively. If it is determined in S201 that a quantity M of data parts corresponding to each of the two TBs is 2, the two data parts corresponding to each of the TB 1 and the TB 2 may be respectively mapped to two BWPs in S202. As shown in FIG. 10d, a data part 1 and a data part 2 that correspond to the TB 1 may be respectively mapped to a BWP 2 in a carrier 1 and a BWP 1 in a carrier 3. A data part 1 and a data part 2 that correspond to the TB 2 may be respectively mapped to a BWP 3 in a carrier 2 and a BWP 4 in a carrier 4. Another mapping manner may alternatively be used. For example, the data part 1 and the data part 2 that correspond to the TB 1 are respectively mapped to the BWP 3 in the carrier 2 and the BWP 1 in the carrier 3, and the data part 1 and the data part 2 that correspond to the TB 2 are respectively mapped to the BWP 2 in the carrier 1 and the BWP 4 in the carrier 4. FIG. 10d is merely a possible example, and imposes no limitation. For another example, it is still assumed that N is 2 and Q is 2, for example, the two TBs are denoted as a TB 1 and a TB 2 respectively. If it is determined in S201 that a quantity M of data parts corresponding to each of the two TBs is 3, the three data parts corresponding to each of the TB 1 and the TB 2 may be respectively mapped to two BWPs in S202. As shown in FIG. 10e, a data part 1, a data part 2, and a data part 3 that correspond to the TB 1 may be mapped to a BWP 2 in a carrier 1 and a BWP 3 in a carrier 2. A data part 1, a data part 2 and a data part 3 that correspond to the TB 2 may be mapped to a BWP 1 in a carrier 3 and a BWP 4 in a carrier 4. Another mapping manner may alternatively be used. FIG. 10e is merely a possible example, and imposes no limitation.

S203: Respectively send, in the Q BWPs, the M data parts corresponding to each TB.

For S203, refer to an execution process of S103. Details are not described herein again.

According to the foregoing method, the sending device may configure different numerologies for different BWP combinations, so that different types of data are sent by using a plurality of different TBs. For example, some TBs are used to send enhanced mobile broadband (eMBB) data, and some other TBs are used to send ultra-reliable and low-latency communications (uRLLC) data. In this way, data transmission is more flexible.

In the embodiments of this application, a group of BWPs used to transmit one TB may be referred to as a BWP bundle or a BWP group.

In the embodiments of this application, at least one BWP group may be configured for a uu interface between a network device (for example, a base station) and a terminal device (for example, UE), and at least one BWP group may also be configured for a sidelink air interface between terminal devices (for example, vehicle-to-vehicle (V2V)).

In the embodiments of this application, a receiving device may receive the M data parts in the Q BWPs used by the sending device to send the M data parts, and determine the N TBs based on the M data parts. When determining the TBs, the receiving device determines the TBs through a process reverse to a process in which the sending device sends the TBs.

In the embodiments of this application, how to determine the M data parts corresponding to the N TBs is not limited. The following provides five methods for determining data parts corresponding to a TB.

The following five methods are all applicable to a case in which N is equal to 1 and a case in which N is an integer greater than 1. When N is an integer greater than 1, for example, there are a plurality of to-be-sent TBs, methods for determining data parts corresponding to each of the TBs may be the same, and reference may be made to a method for determining data parts corresponding to one TB. Quantities of data parts corresponding to the TBs may be the same or may be different. This is not limited in this application. For ease of description, each method is described by using an example in which data parts corresponding to only one TB are determined.

Method 1: M CBs are determined based on N TBs, and the M CBs are M data parts.

When N is equal to 1, in the foregoing method 1, M CBs are determined based on one TB.

Figure 11:
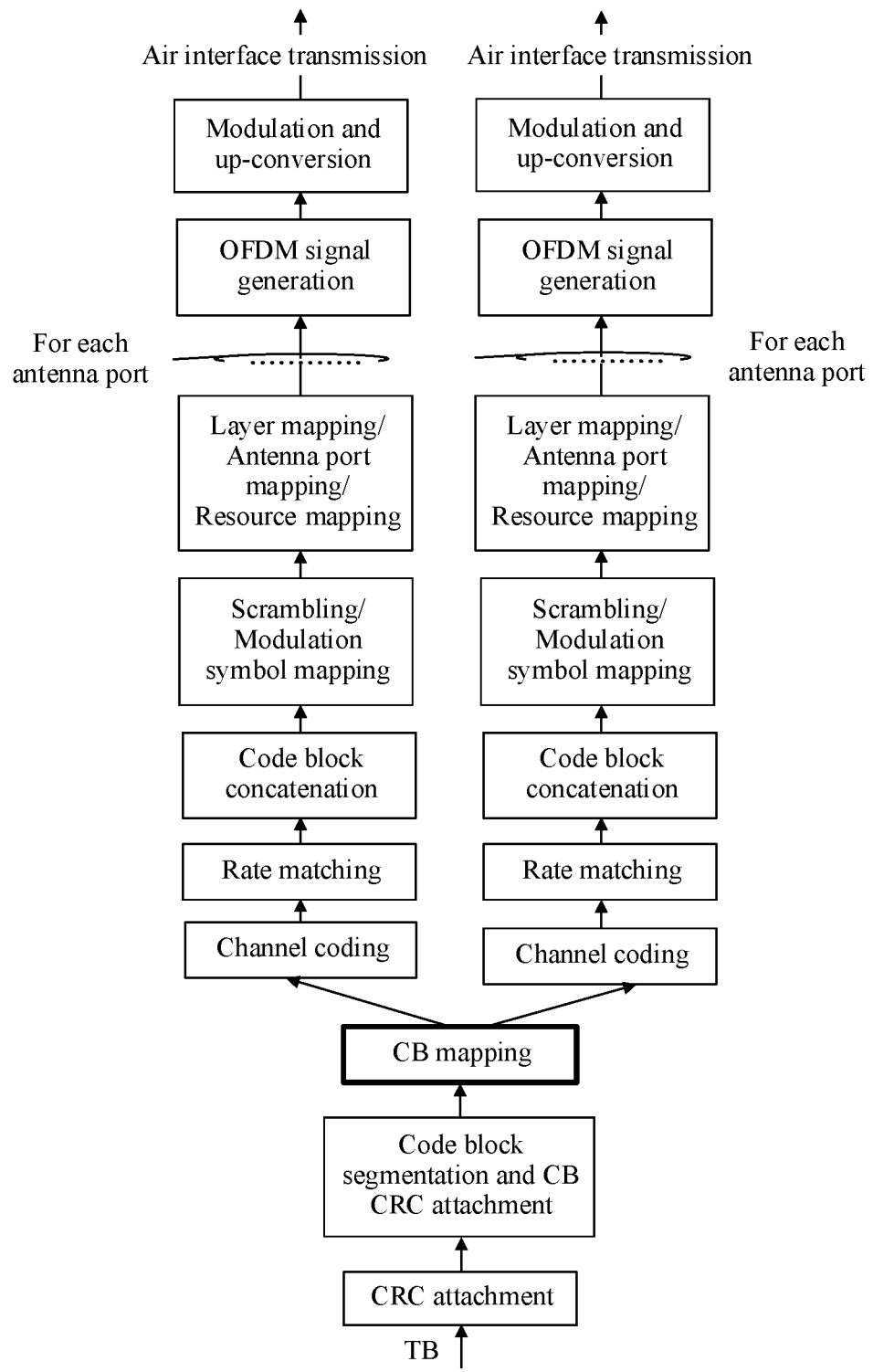
FIG. 11 is a schematic flowchart of sending a TB according to an embodiment of this application.

In an embodiment, referring to FIG. 11, after a TB is input and processed by a CRC attachment module, a TB to which cyclic redundancy code (CRC) is attached may be obtained, data corresponding to the TB to which the CRC is attached is segmented into M CBs, and the M CBs are determined as M data parts corresponding to the TB. It should be noted that the M data parts may be data obtained after the CRC is separately attached to the M CBs. The CRC is used for data check. For example, the CRC may be 16 bits or 24 bits.

In the method 1, after the data corresponding to the TB is segmented into the M CBs, an independently configured channel coding scheme and/or rate matching parameter may be used for the M CBs, so that an independent processing capability of each branch link can be improved, thereby improving HARQ transmission efficiency and link adaptation efficiency.

In the embodiments of this application, the channel coding scheme may be a turbo coding scheme, a polar coding scheme, an LDPC coding scheme, or the like. Rate matching means that a bit obtained after channel coding is retransmitted (repeated) or punctured to match a bearer capability of a physical channel. The rate matching parameter is a parameter related to the rate matching.

A CB mapping module in FIG. 11 is a newly added module in this application. A function of the module may be considered as mapping the M data parts (for example, the M CBs in the method 1) corresponding to the TB to Q branches, and a data part in each branch is mapped to one active BWP for sending. Any two of Q active BWPs may be located in different carriers, or may be located in a same carrier. An example in which BWPs for mapping are located in different carriers is used in the procedure of sending the TB in FIG. 11. When BWPs for mapping are located in a same carrier, there may be one OFDM signal generation module and there may be one modulation and up-conversion module after the OFDM signal generation module in FIG. 11.

It should be noted that the foregoing method 1 is not only applicable to a case in which M is greater than or equal to Q, but also applicable to a case in which M<Q. The following describes how to determine, when M<Q, M data parts corresponding to one TB. When determining that a quantity M of CBs corresponding to one TB is less than Q, the sending device may further combine the M CBs into S (S is greater than or equal to Q) bits, and then map the S bits to the Q BWPs.

Method 2: M bits are determined based on N TBs, and the M bits are M data parts.

When N is equal to 1, in the foregoing method 2, M bits are determined based on one TB.

Figure 12:
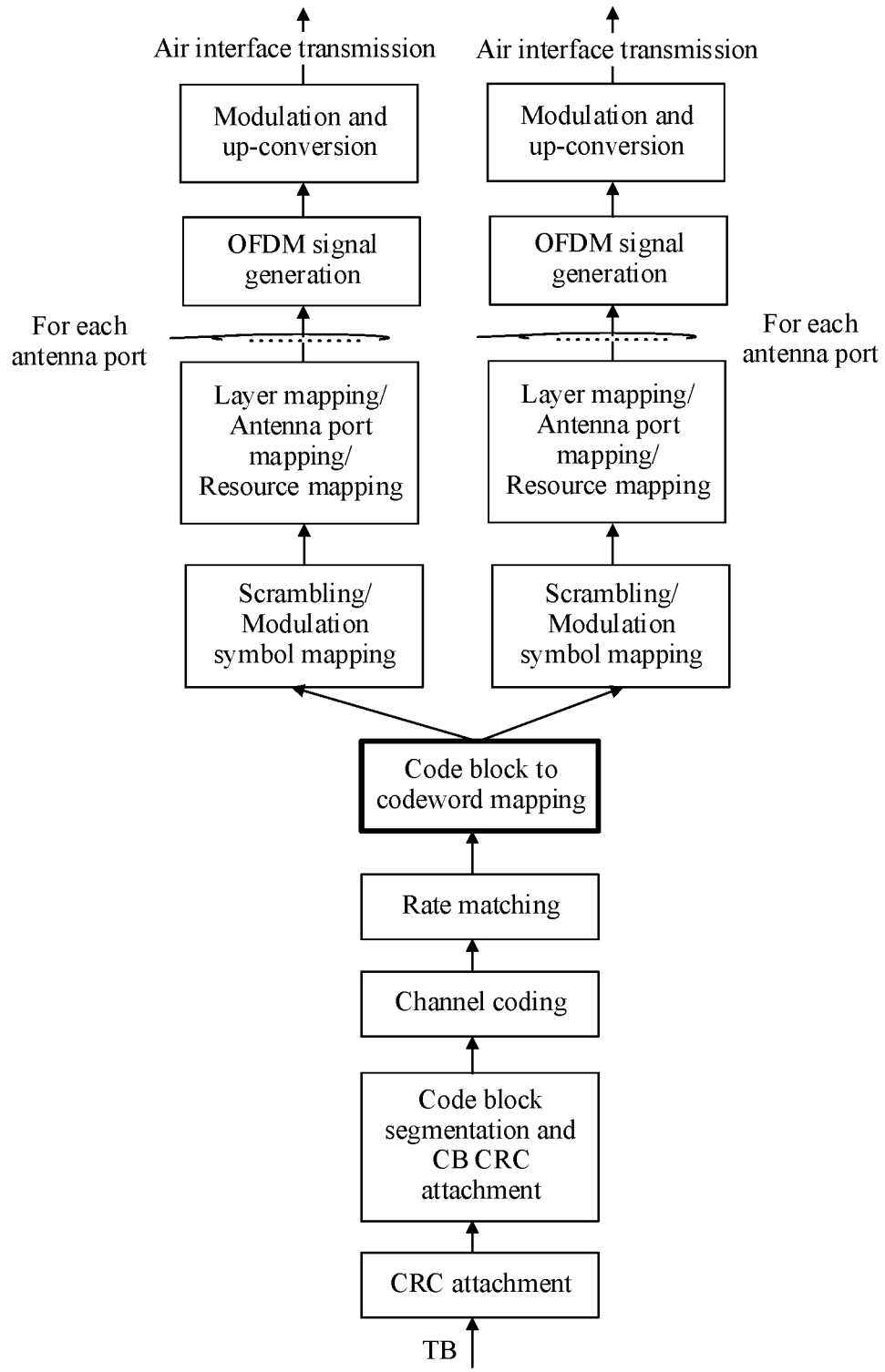
FIG. 12 is another schematic flowchart of sending a TB according to an embodiment of this application.

In an embodiment, referring to FIG. 12, after a rate matching module performs processing, all bits included in a data stream obtained after the rate matching module performs the processing may be determined as M bits.

It may be understood that, determining M bits may alternatively be determining, as M bits after a CB segmentation and CB CRC attachment module performs processing, all bits included in a data stream obtained after the CB segmentation and CB CRC attachment module performs the processing. Determining M bits may alternatively be determining, as M bits after the TB is input and no processing is performed on the TB and before a CRC attachment module performs processing, all bits included in the TB. In other words, all the bits included in the TB are determined as M data parts corresponding to the TB. Determining M bits may alternatively be determining, as M bits after a CRC attachment module performs processing to obtain a TB to which a CRC is attached, all bits included in the TB to which the CRC is attached. In other words, all the bits included in the TB to which the CRC is attached are determined as M data parts corresponding to the TB.

It should be noted that the method 2 is applicable to a scenario in which one TB is segmented into one CB, and certainly, is also applicable to a scenario in which one TB is segmented into a plurality of CBs. This is not limited in this application.

Method 3: M CBs are determined based on N TBs, channel coding is performed on the M CBs to obtain M encoded output blocks, and M data parts are determined based on the M encoded output blocks.

When N is equal to 1, in the method 3, M CBs are determined based on one TB, channel coding is performed on the M CBs to obtain M encoded output blocks, and then M data parts are determined based on the M encoded output blocks.

In an embodiment, referring to FIG. 12, after one TB is processed by a CB segmentation and CB CRC attachment module, M CBs may be obtained. After channel coding (channel coding module) is performed on the M CBs, M encoded output blocks may be obtained. After the M encoded output blocks are obtained, M rate matching output blocks are obtained after the M encoded output blocks are processed by a rate matching module. The M rate matching output blocks are determined as M data parts. In an embodiment of this application, the M encoded output blocks may be retransmitted (repeated) or punctured by using the rate matching module, to obtain the M rate matching output blocks.

It should be noted that the foregoing method 3 is not only applicable to a case in which M is greater than or equal to Q, but also applicable to a case in which M<Q. When determining that a quantity M of CBs corresponding to one TB is less than Q, a sending device may further combine the M rate matching output blocks into S (S is greater than or equal to Q) bits after obtaining the M rate matching output blocks, and then map the S bits to Q BWPs.

It may be understood that the M encoded output blocks obtained in the foregoing implementation may alternatively be determined as M data parts.

It may be understood that the M data parts in the method 3 may also be understood as M data parts determined before resource mapping and/or modulation mapping.

In the method 3, the data parts corresponding to the TB are determined after the channel coding. A code block to codeword mapping module in FIG. 12 is a newly added module in this application. A function of the module is to map the M data parts corresponding to the TB to Q branches, so as to map the M data parts to the Q active BWPs. Any two of the Q active BWPs may be located in different carriers, or may be located in a same carrier. An example in which BWPs for mapping are located in different carriers is used in the procedure of sending the TB in FIG. 12. When BWPs for mapping are located in a same carrier, there may be one OFDM signal generation module and there may be one modulation and up-conversion module after the OFDM signal generation module in FIG. 12.

Method 4: P CBs are determined based on N TBs, channel coding is performed on the P CBs to obtain P encoded output blocks, M encoded CBGs are determined based on the P encoded output blocks, where each encoded CBG corresponds to at least one CB, and M data parts are determined based on the M encoded CBGs, where P is an integer greater than or equal to M.

When N is equal to 1, in the method 4, P CBs are determined based on one TB, channel coding is performed on the P CBs to obtain P encoded output blocks, M CBGs are determined based on the P encoded output blocks, and M data parts are determined based on the M CBGs.

In an embodiment, referring to FIG. 12, after one TB is processed by a CB segmentation and CB CRC attachment module, P CBs may be obtained. After channel coding (channel coding module) is performed on the P CBs, P encoded output blocks may be obtained. When P is equal to M, M encoded CBGs are obtained by using the P encoded output blocks in a one-to-one correspondence. When P is an integer greater than M, the P encoded output blocks are combined into M encoded CBGs by using the method for determining a CBG according to (11) in the explanations of some terms in this application. After the M encoded CBGs are obtained, M rate matching output blocks are obtained after the M encoded CBGs are processed by a rate matching module. The M rate matching output blocks are determined as M data parts.

It may be understood that, in addition to the manner shown in FIG. 12, in an embodiment of this application, the M data parts may alternatively be mapped from a location at which data corresponding to the TB is segmented into the M data parts to Q BWPs. Certainly, the M data parts may alternatively be mapped from a location other than a location at which data corresponding to the TB is segmented into the M data parts to BWPs. This is not limited in this application.

It should be noted that the foregoing method 4 is not only applicable to a case in which M is greater than or equal to Q, but also applicable to a case in which M<Q. The following describes how to determine, when M<Q, M data parts corresponding to one TB.

When determining that a quantity M of encoded CBGs corresponding to one TB is less than Q, a sending device may further combine the M rate matching output blocks into S (S is greater than or equal to Q) bits after obtaining the M rate matching output blocks, and then map the S bits to the Q BWPs.

It may be understood that the M encoded CBGs obtained in the foregoing implementation may alternatively be determined as M data parts.

Method 5: M symbols are determined based on N TBs, and M data parts are determined based on the M symbols.

When N is equal to 1, in the method 5, M symbols are determined based on one TB, and then M data parts may be determined based on the M symbols.

Figure 13:
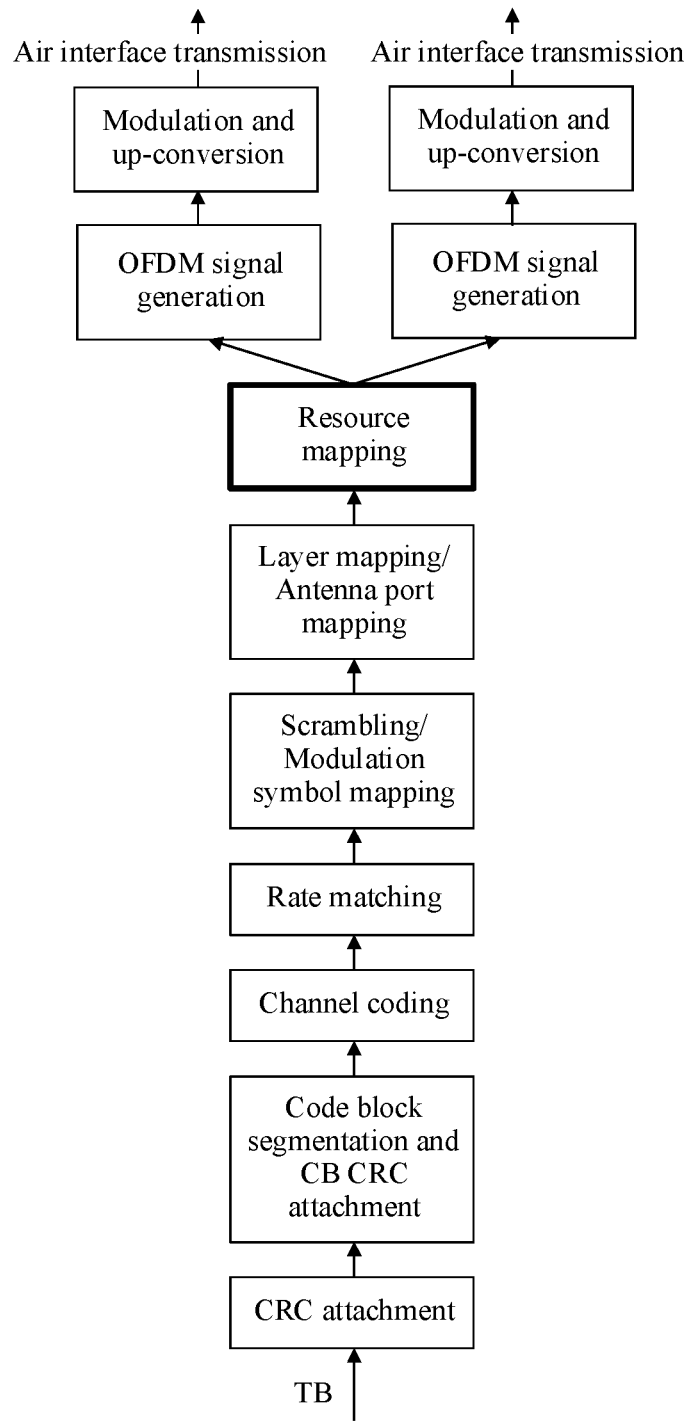
FIG. 13 is still another schematic flowchart of sending a TB according to an embodiment of this application.

In an implementation, referring to FIG. 13, a resource mapper module in FIG. 13 is a newly added module. In this application, the resource mapper module determines, as M symbols, all symbols included in a data stream obtained by performing a series of processing on one TB. Then, the M symbols may be determined as M data parts. Certainly, after the M symbols are determined, other processing may be further performed on the M symbols, and processed M symbols are determined as M data parts.

It should be noted that, a layer mapper/antenna port mapping/resource mapper module in the accompanying drawings in this specification of this application does not indicate that the layer mapper module, the antenna port mapping module, and the resource mapper module are integrated into a same module. For convenience, these modules are drawn in the same module in the accompanying drawings. In actual application, these modules may be independent modules. Similarly, for convenience, a scrambling module and a modulation mapper module are drawn in a same module in the accompanying drawings.

In the embodiments of this application, a method used to map the M data parts to the Q BWPs is not limited.

In an implementation, the M data parts are evenly mapped to the Q BWPs. That the M data parts are evenly mapped to the Q BWPs may mean that after the M data parts are mapped to the Q BWPs, a difference between quantities of data parts mapped to any two of the Q BWPs is less than a preset threshold, and the preset threshold may be determined based on an actual situation, for example, may be 1, or may be 2. This is not limited in this application.

The following provides several possible methods for evenly mapping the M data parts to the Q BWPs.

Method 1: F data parts are mapped to each of Q−1 BWPs included in the Q BWPs, where F is an integer obtained after $$\frac{M}{Q}$$

is rounded off, and M−(Q−1)·F data parts are mapped to one BWP, included in the Q BWPs, other than the Q−1 BWPs. For example, if M is equal to 14 and Q is equal to 4, F is an integer 4 obtained after ¹⁴⁄₄=3.5 is rounded off.

Figure 14A:
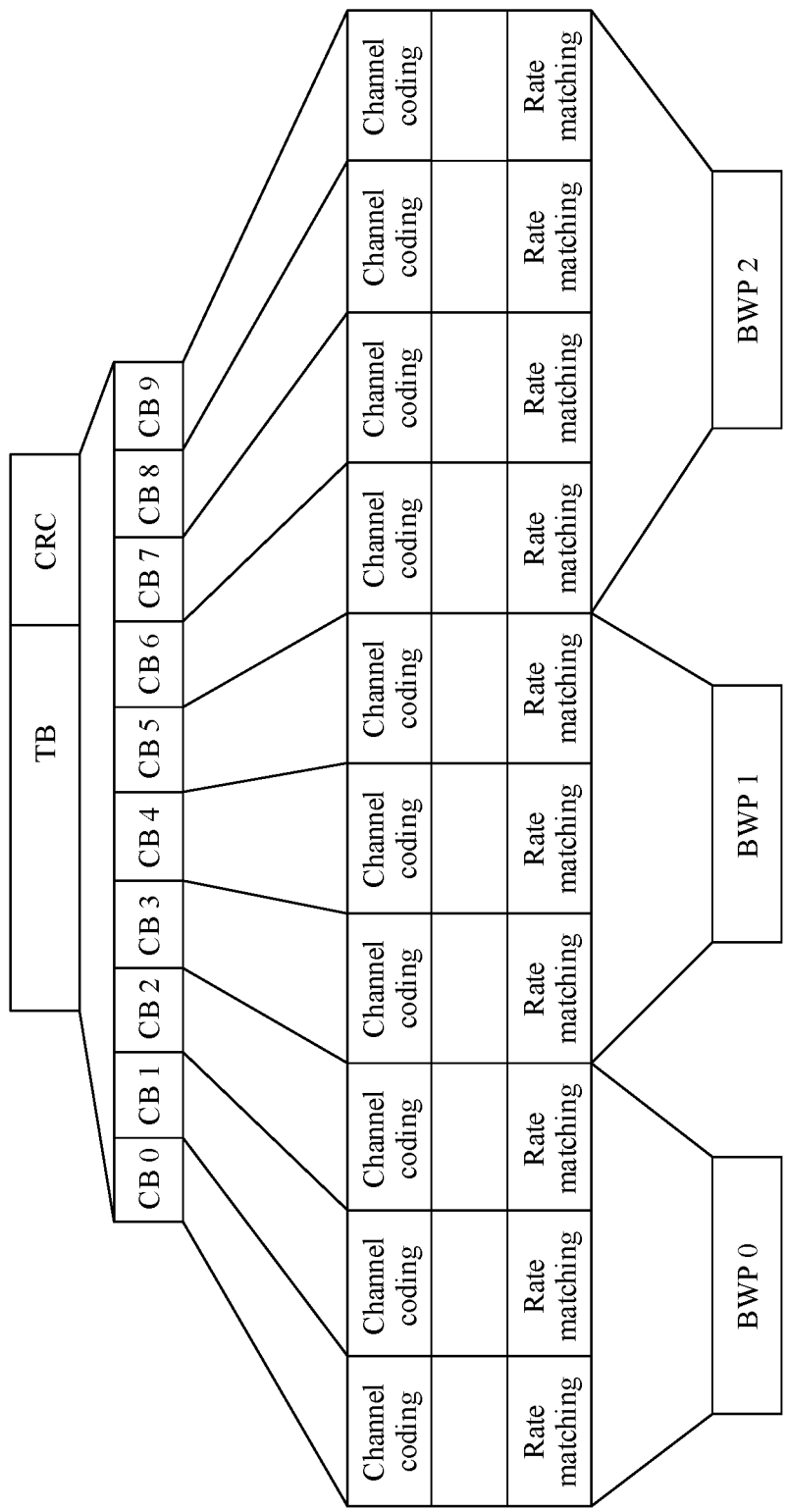
FIG. 14a to FIG. 14f are schematic diagrams of mapping data parts to BWPs according to an embodiment of this application.
Figure 14B:
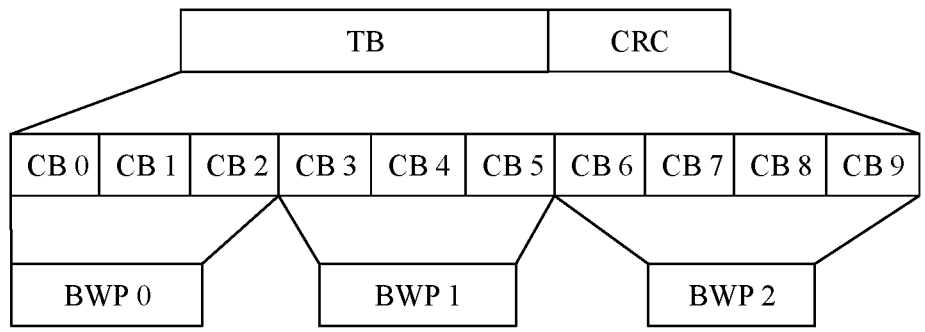
Figure 14C:
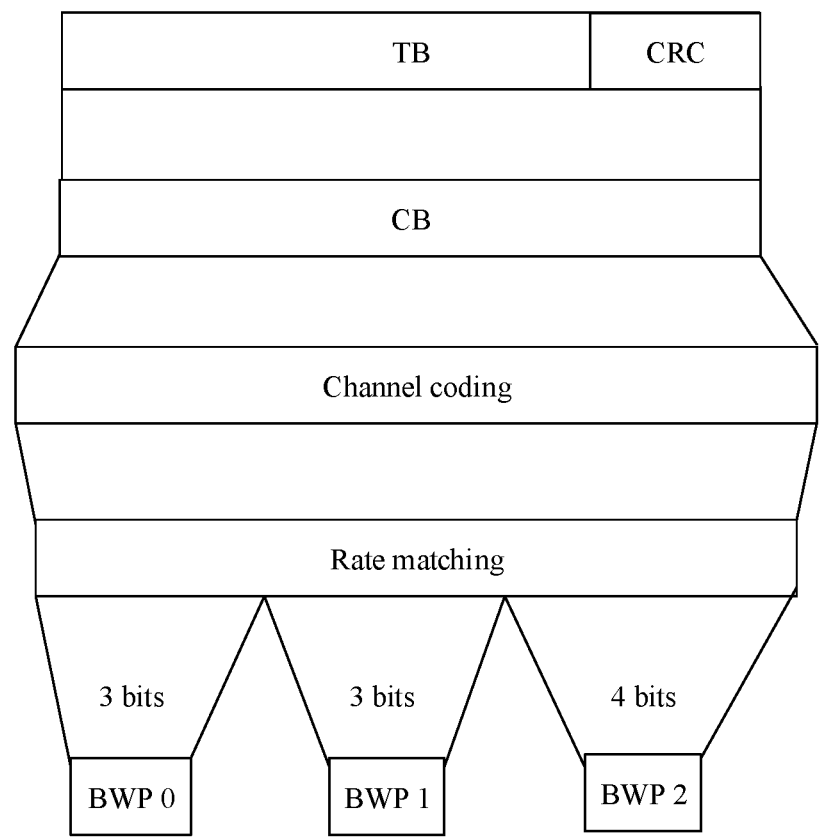

The following uses mapping of one TB as an example for description. When there are a plurality of TBs, a method for mapping one TB may be used for each TB. For example, it is assumed that a quantity M of data parts corresponding to one TB is 10 and Q is 3, and it is assumed that the data parts corresponding to the TB are determined by using the foregoing method 3. FIG. 14a is a schematic diagram of mapping M data parts to Q BWPs by using the method 1. F (F is an integer 3 obtained after ¹⁰⁄₃ is rounded off) data parts are mapped to each of Q−1=2 BWPs, and 10−(3−1)×3=4 data parts are mapped to one remaining BWP. As shown in FIG. 14a, data parts corresponding to a CB 0, a CB 1, and a CB 2 are mapped to a BWP 0, data parts corresponding to a CB 3, a CB 4, and a CB 5 are mapped to a BWP 1, and data parts corresponding to a CB 6, a CB 7, a CB 8, and a CB 9 are mapped to a BWP 2. For another example, it is assumed that a quantity M of data parts corresponding to one TB is still 10 and Q is 3, and it is assumed that the data parts corresponding to the TB are determined by using the foregoing method 1. FIG. 14b is a schematic diagram of mapping M data parts to Q BWPs by using the method 1. For still another example, it is assumed that a quantity M of data parts corresponding to one TB is still 10 and Q is 3, and it is assumed that the data parts corresponding to the TB are determined by using the foregoing method 2. For example, all bits included in a data stream obtained after a rate matching module performs processing are determined as M bits. FIG. 14c is a schematic diagram of mapping M data parts to Q BWPs by using the method 1. It should be noted that in this application, 10 bits are merely used as an example for description. In actual application, a quantity of bits included in a data stream corresponding to one TB may be far greater than 10.

Method 2:

$$\left\lfloor \frac{M}{Q} \right\rfloor$$

data parts are mapped to each of Q−1 BWPs included in the Q BWPs, and $$M - (Q-1) \cdot \left\lfloor \frac{M}{Q} \right\rfloor$$

data parts are mapped to one BWP, included in the Q BWPs, other than the Q−1 BWPs.

Method 3:

$$\left\lceil \frac{M}{Q} \right\rceil$$

data parts are mapped to each of Q−1 BWPs included in the Q BWPs, and $$M - (Q-1) \cdot \left\lceil \frac{M}{Q} \right\rceil$$

data parts are mapped to one BWP, included in the Q BWPs, other than the Q−1 BWPs.

Figure 14D:
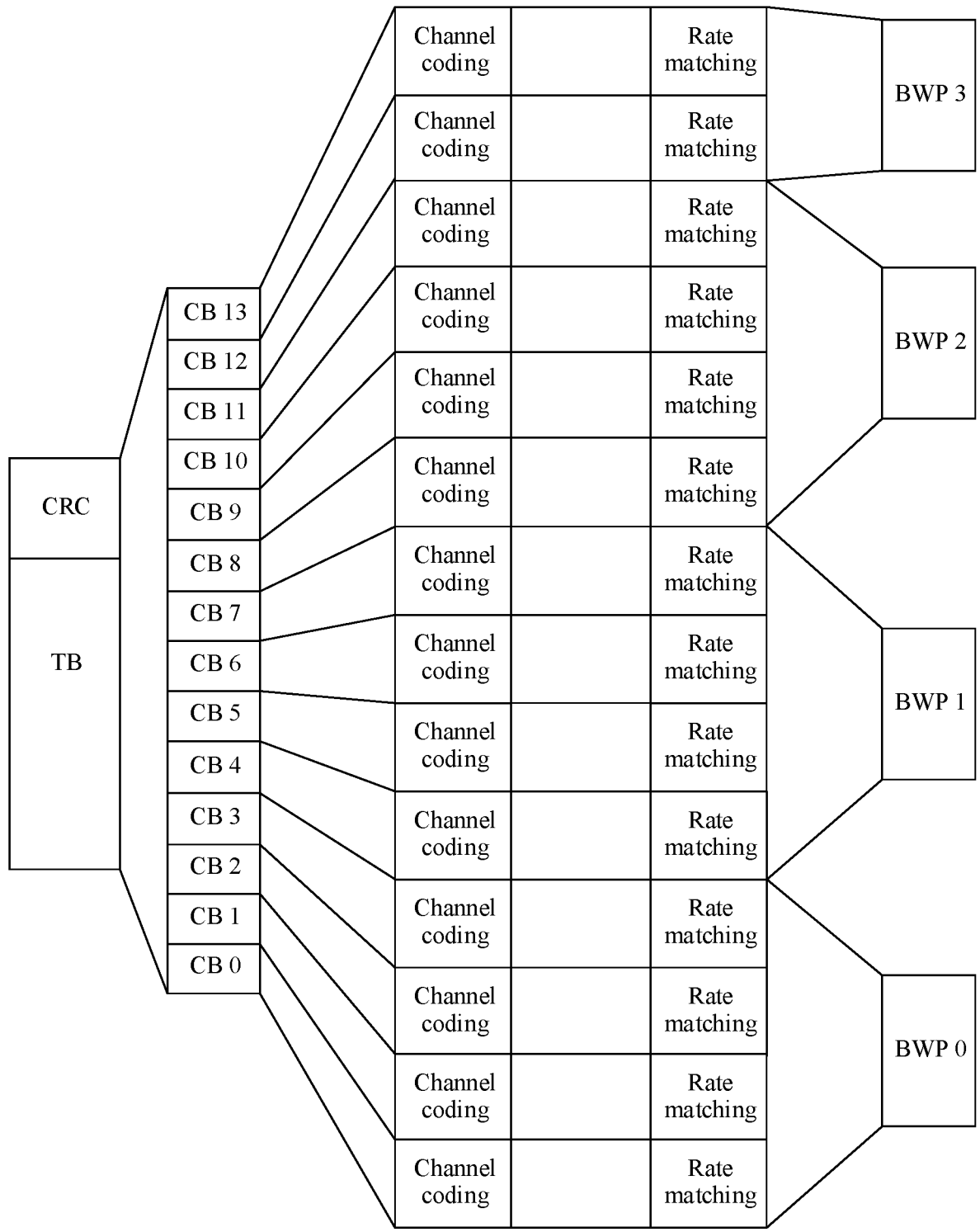
Figure 14E:
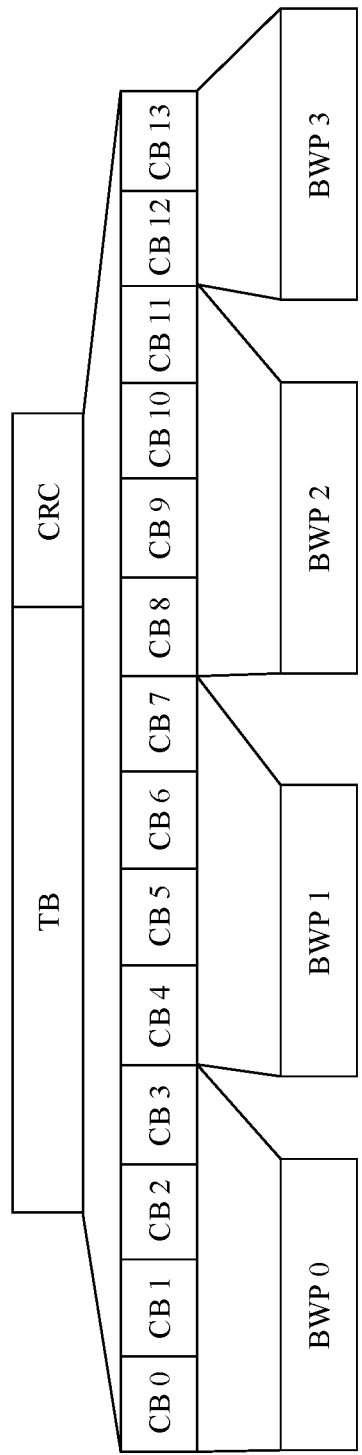
Figure 14F:
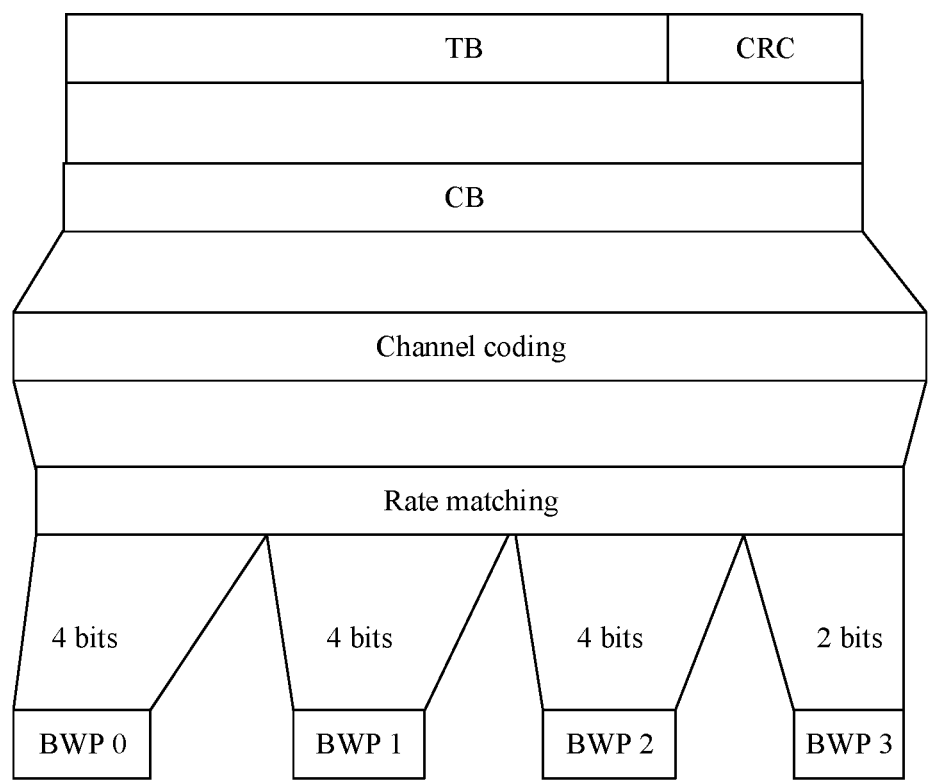

The following uses mapping of one TB as an example for description. When there are a plurality of TBs, a method for mapping one TB may be used for each TB. For example, it is assumed that a quantity M of data parts corresponding to one TB is 14 and Q is 4, and it is assumed that the data parts corresponding to the TB are determined by using the foregoing method 3. FIG. 14d is a schematic diagram of mapping M data parts to QBWPs by using the method 3. ⌈¹⁴⁄₄⌉=4 data parts are mapped to each of Q−1=3 BWPs, and 14−(4−1)·⌈¹⁴⁄₄⌉=2 data parts are mapped to one remaining BWP. As shown in FIG. 14d, data parts corresponding to a CB 0, a CB 1, a CB 2, and a CB 3 are mapped to a BWP 0, data parts corresponding to a CB 4, a CB 5, a CB 6, and a CB 7 are mapped to a BWP 1, data parts corresponding to a CB 8, a CB 9, a CB 10, and a CB 11 are mapped to a BWP 2, and data parts corresponding to a CB 12 and a CB 13 are mapped to a BWP 3. For another example, it is assumed that a quantity M of data parts corresponding to one TB is still 14 and Q is 4, and it is assumed that the data parts corresponding to the TB are determined by using the foregoing method 1. FIG. 14e is a schematic diagram of mapping M data parts to Q BWPs by using the method 3. For still another example, it is assumed that a quantity M of data parts corresponding to one TB is 14 and Q is 4, and it is assumed that the data parts corresponding to the TB are determined by using the foregoing method 2. For example, all bits included in a data stream obtained after a rate matching module performs processing are determined as M bits. FIG. 14f is a schematic diagram of mapping M data parts to Q BWPs by using the method 3. It should be noted that in this application, 14 bits are merely used as an example for description. In actual application, a quantity of bits included in a data stream corresponding to one TB may be far greater than 14.

Method 4: $M_1$ is first defined, where $M_1$ satisfies a formula: $M_1 = \mathrm{mod}(M, Q)$.

If $M_1$ is equal to 0, $$\frac{M}{Q}$$

data parts are mapped to each of the Q BWPs; or if $M_1$ is greater than 0, $$\left\lceil \frac{M}{Q} \right\rceil$$

data parts are mapped to each of $M_1$ BWPs included in the Q BWPs, and $$\left\lfloor \frac{M}{Q} \right\rfloor$$

data parts are mapped to each BWP, included in the Q BWPs, other than the $M_1$ BWPs.

In an embodiment, $K_1$ and $K_2$ are defined, where $K_1$ and $K_2$ respectively satisfy formulas:

$$K_1 = \left\lceil \frac{M}{Q} \right\rceil \text{ and } K_2 = \left\lfloor \frac{M}{Q} \right\rfloor.$$

Data parts whose index are $M_1 \cdot K_1 + (m-M_1) \cdot K_2 + k$, $k=0, 1, \ldots, K_2-1$ are mapped to BWPs whose index are $m=M_1, M+1, \ldots, M-1$, and data parts whose index are $m \cdot K_1 + k$, $k=0, 1, \ldots, K_1-1$ are mapped to BWPs whose index are $m=0, 1, \ldots, M_1-1$.

Figure 15A:
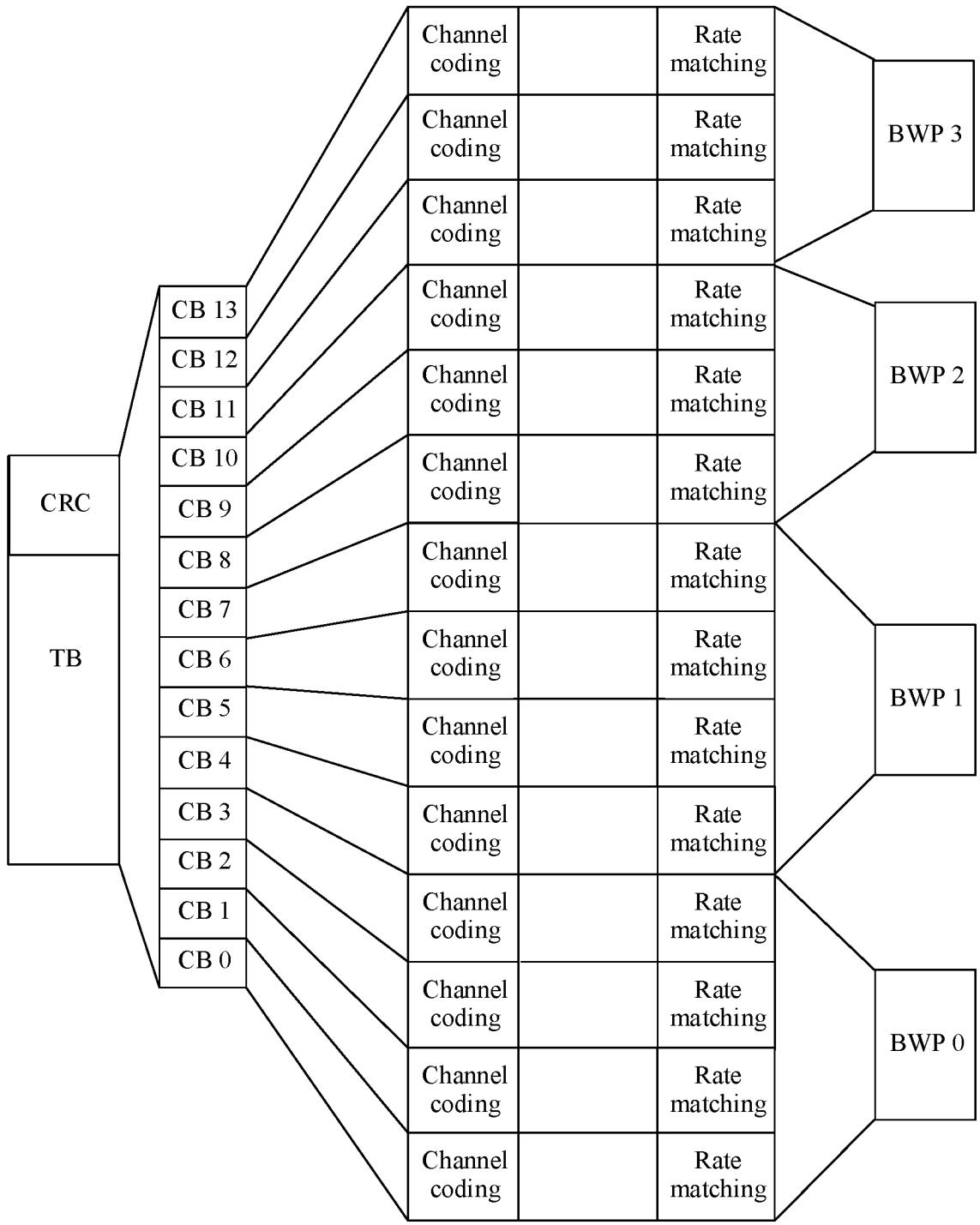
FIG. 15a to FIG. 15c are schematic diagrams of mapping data parts to BWPs according to an embodiment of this application.
Figure 15B:
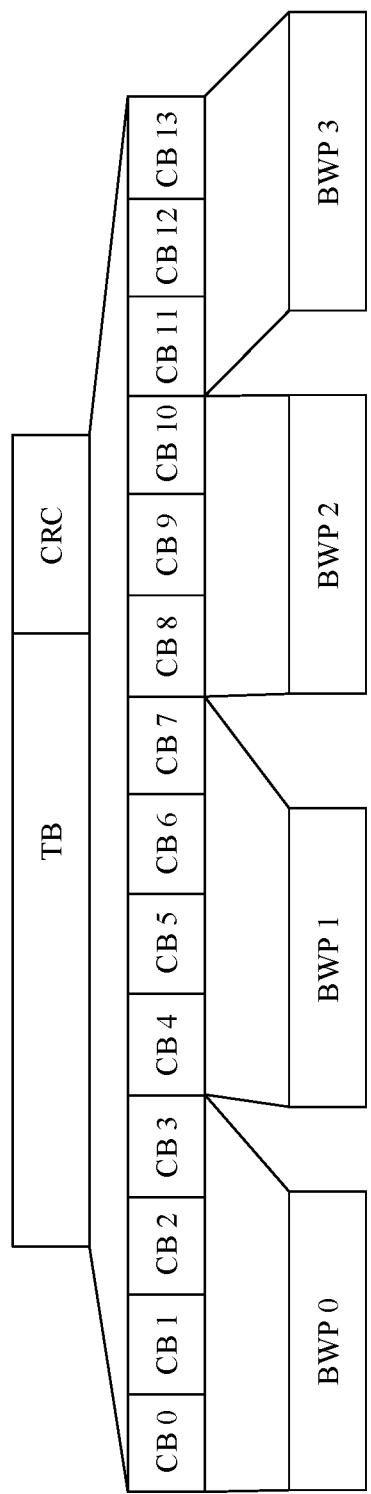
Figure 15C:
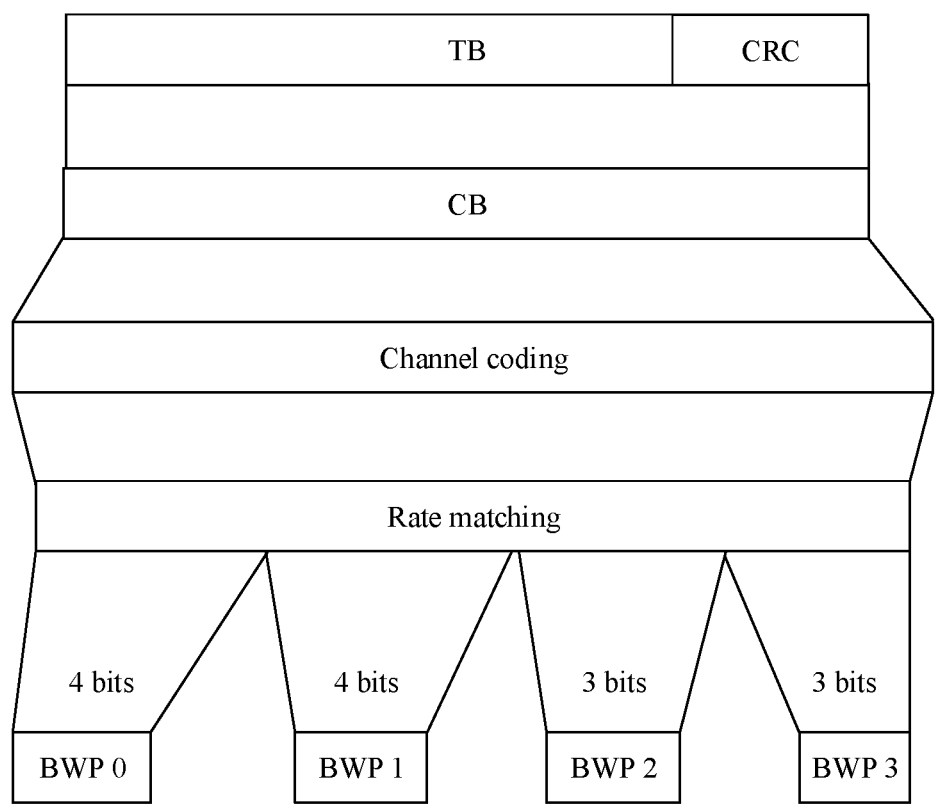

The following uses mapping of one TB as an example for description. When there are a plurality of TBs, a method for mapping one TB may be used for each TB. For example, it is assumed that a quantity M of data parts corresponding to one TB is 14 and Q is 4, and it is assumed that the data parts corresponding to the TB are determined by using the foregoing method 3. FIG. 15a is a schematic diagram of mapping M data parts to Q BWPs by using the method 4. $\lfloor 14/4 \rfloor = 3$ data parts are mapped to each of $M_1 = \text{mod}(M,Q)=2$ BWPs included in the four BWPs, and $\lceil 14/4 \rceil = 4$ data parts are mapped to each of remaining BWPs. As shown in FIG. 15a, data parts corresponding to a CB 0, a CB 1, a CB 2, and a CB 3 are mapped to a BWP 0, data parts corresponding to a CB 4, a CB 5, a CB 6, and a CB 7 are mapped to a BWP 1, data parts corresponding to a CB 8, a CB 9, and a CB 10 are mapped to a BWP 2, and data parts corresponding to a CB 11, a CB 12, and a CB 13 are mapped to a BWP 3. For another example, it is assumed that a quantity M of data parts corresponding to one TB is still 14 and Q is 4, and it is assumed that the data parts corresponding to the TB are determined by using the foregoing method 1. FIG. 15b is a schematic diagram of mapping M data parts to Q BWPs by using the method 4. For still another example, it is assumed that a quantity M of data parts corresponding to one TB is 14 and Q is 4, and it is assumed that the data parts corresponding to the TB are determined by using the foregoing method 2. FIG. 15c is a schematic diagram of mapping M data parts to Q BWPs by using the method 4.

It may be understood that the foregoing examples are merely described by using an example in which the data parts are CBs or bits. When the data parts are in a form of CBGs, symbols, data blocks, or the like, the method 1 and the method 2 may also be used to evenly map the M data parts to the Q BWPs. For example, when a quantity of CBGs is greater than 1, the CBs in FIG. 14a to FIG. 14f and FIG. 15a to FIG. 15c only need to be replaced with CBGs. When a quantity of CBGs is 1 and a quantity of CBs included in the CBG is greater than 1, a method for mapping a plurality of CBs to BWPs, when no CBG is configured in a system, is used. When a quantity of CBGs is 1 and a quantity of CBs included in the CBG is also 1, a method for mapping one CB to BWPs, when no CBG is configured in a system, is used (refer to FIG. 14c, FIG. 14f, or FIG. 15c).

It should be noted that, when the data parts corresponding to the TB are a CBG, and a CBG-based HARQ feedback is configured in the system, according to the method in this application, if an error occurs in a process of sending the TB, only a CBG having an error needs to be retransmitted, and a CBG correctly received by a receiving device does not need to be retransmitted. However, according to an existing method, one TB is mapped to one BWP in one carrier for sending, and once an error occurs during transmission, the entire TB needs to be retransmitted. According to the method in this application, the correctly received CBG does not need to be retransmitted, so that utilization of air interface resources can be improved.

In the embodiments of this application, when a serving cell includes only one carrier, the data parts may be mapped to BWPs of the serving cell by using a cell index in combination with a BWP index. When a serving cell includes a plurality of carriers, the carriers in the serving cell need to be numbered to obtain an index corresponding to each carrier, and then mapping is performed by using a carrier index in combination with a BWP index. A BWP configured and a BWP activated in a carrier are identified by using BWP indexes.

Figure 16A:
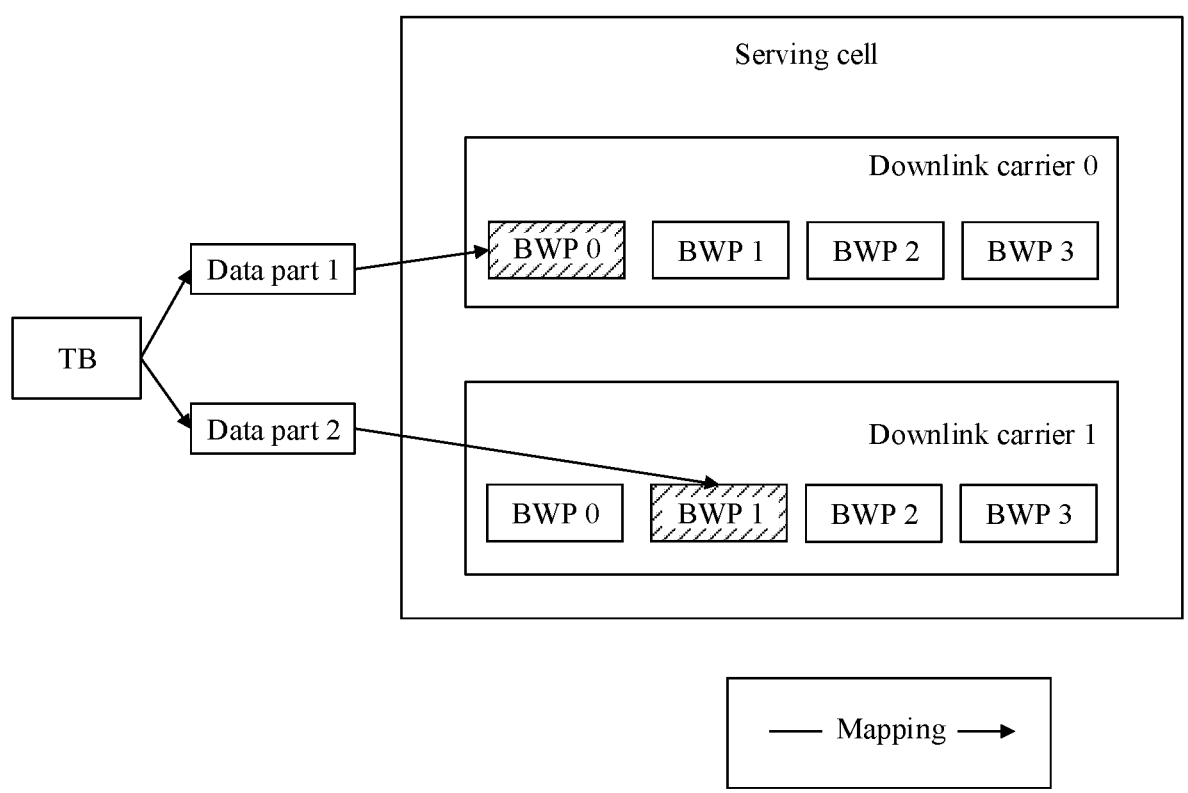
FIG. 16a and FIG. 16b are schematic diagrams of mapping data parts to BWPs according to an embodiment of this application.
Figure 16B:
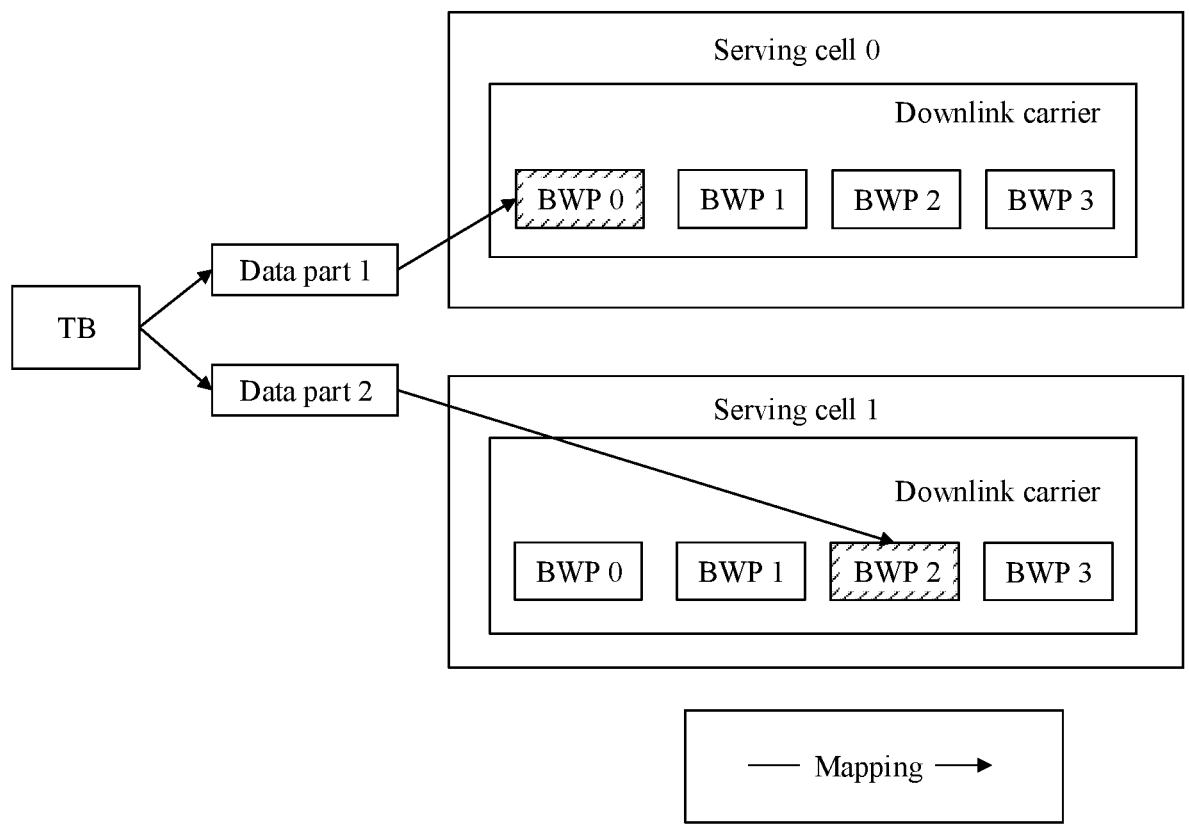

For example, in FIG. 16a and FIG. 16b, only a downlink carrier is used as an example for description. A global BWP index may be used to identify a BWP to which a data part is to be mapped. In FIG. 16a, it is assumed that global BWP index=carrier index*T+BWP index, and in FIG. 16b, it is assumed that global BWP index=cell index*T+BWP index, where T is a total quantity of BWPs configured for a terminal device in a carrier, and T in FIG. 16a and FIG. 16b is 4. It should be noted that, in actual application, a carrier number may be determined as an index corresponding to a carrier, a cell number may be determined as an index corresponding to a cell, and a BWP number may be determined as an index corresponding to a BWP. For example, in FIG. 16a, a carrier index corresponding to a BWP to which a data part 1 is mapped is 0, and a BWP index is 0. Therefore, a global BWP index of the BWP to which the data part 1 is mapped is 0*4+0=0. In FIG. 16a, a carrier index corresponding to a BWP to which a data part 2 is mapped is 1, and a BWP index is 1. Therefore, a global BWP index of the BWP to which the data part 2 is mapped is 1*4+1=5. In FIG. 16b, a cell index corresponding to a BWP to which a data part 1 is mapped is 0, and a BWP index is 0. Therefore, a global BWP index of the BWP to which the data part 1 is mapped is 0*4+0=0. In FIG. 16b, a cell index corresponding to a BWP to which a data part 2 is mapped is 1, and a BWP index is 2. Therefore, a global BWP index of the BWP to which the data part 2 is mapped is 1*4+2=6.

The foregoing describes the method provided in the embodiments of this application. To implement functions in the method provided in the embodiments of this application, the sending device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraint conditions of the technical solutions.

Figure 17:
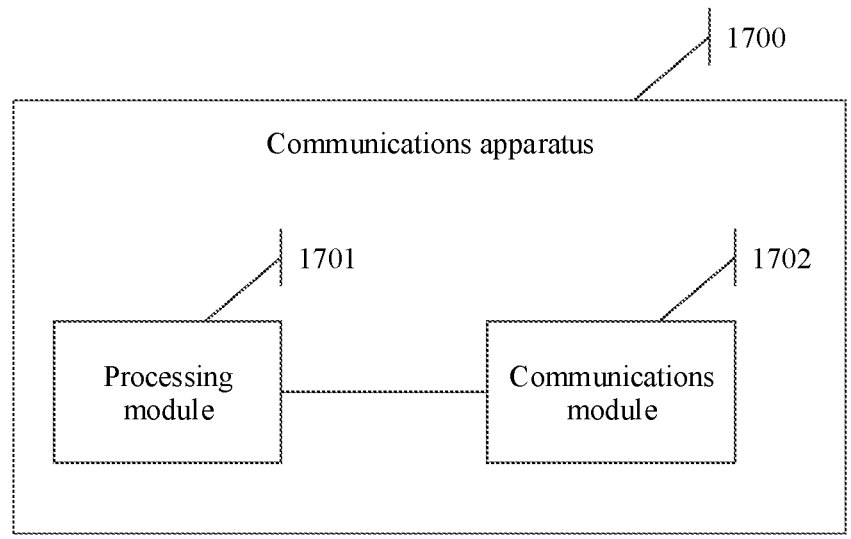
FIG. 17 is a schematic structural diagram of a communications apparatus according to an embodiment of this application.

FIG. 17 is a schematic structural diagram of a communications apparatus 1700. The communications apparatus 1700 may be a network device or a terminal device, and can implement functions of the sending device in the method provided in the embodiments of this application. Alternatively, the communications apparatus 1700 may be an apparatus that can support a terminal device or a network device in implementing functions in the method provided in the embodiments of this application. The communications apparatus 1700 may be a hardware structure, a software module, or a combination of the hardware structure and the software module. The communications apparatus 1700 may alternately be implemented by a chip system. In an embodiment of this application, the chip system may include a chip, or may include a chip and another discrete component.

The communications apparatus 1700 may include a processing module 1701 and a communications module 1702.

The communications module 1702 may be configured to perform S103 and S203 shown in FIG. 8a or FIG. 8b in the embodiments of this application, and/or be configured to support another process of the technology described in this specification. The communications module 1702 is configured to implement communication between the communications apparatus 1700 and another module, and may be a circuit, a component, an interface, a bus, a software module, a transceiver, or any other apparatus that can implement communication.

The processing module 1701 is configured to perform S101, S102, S201, and S202 shown in FIG. 8a or FIG. 8b in the embodiments of this application, and/or be configured to support another process of the technology described in this specification. All related content of the operations in the foregoing method embodiments may be cited in function descriptions of corresponding function modules. Details are not described herein again.

Module division in the embodiments of this application is an example, is merely logical function division, and may be other division in actual implementation. In addition, function modules in the embodiments of this application may be integrated into one processor, or each of the modules may exist alone physically, or two or more modules are integrated into one module. The foregoing integrated module may be implemented in a form of hardware, or may be implemented in a form of a software function module.

Figure 18:
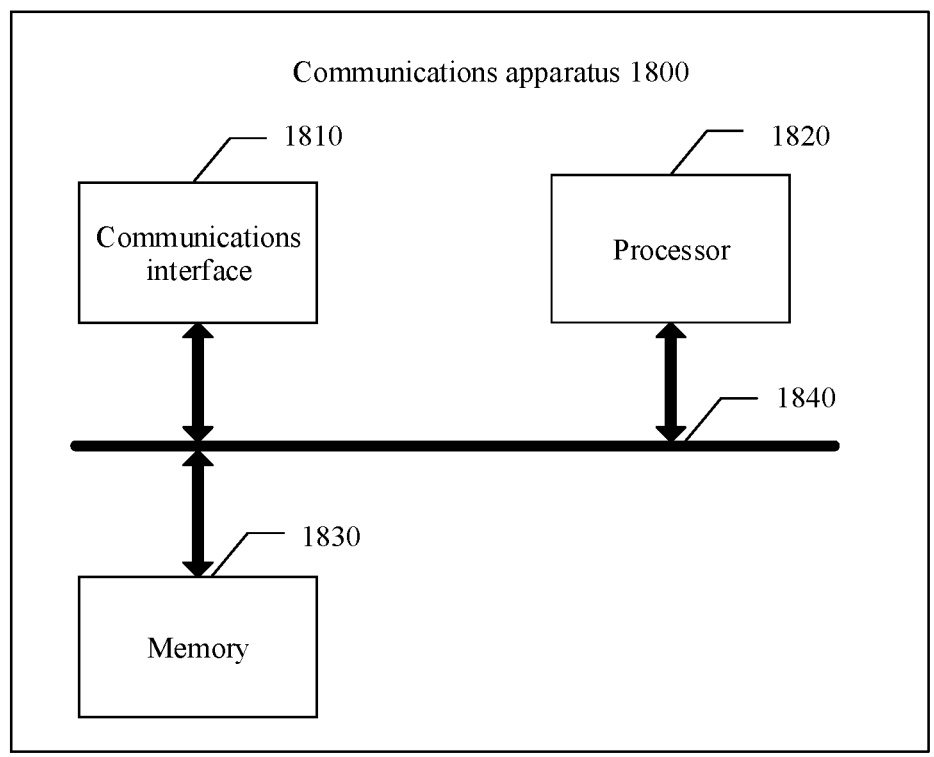
FIG. 18 is a schematic structural diagram of another communications apparatus according to an embodiment of this application.

FIG. 18 shows a communications apparatus 1800 according to an embodiment of this application. The communications apparatus 1800 may be a network device or a terminal device, and can implement functions of the sending device in the method provided in the embodiments of this application. Alternatively, the communications apparatus 1800 may be an apparatus that can support a network device or a terminal device in implementing functions of the sending device in the method provided in the embodiments of this application. The communications apparatus 1800 may be a chip system.

The communications apparatus 1800 includes at least one processor 1820, configured to implement or support the communications apparatus 1800 in implementing the functions of the sending device in the method provided in the embodiments of this application. The processor 1820 may be configured to perform S101, S102, S201, and S202 shown in FIG. 8a or FIG. 8b in the embodiments of this application, and/or be configured to support another process of the technology described in this specification. For details, refer to detailed descriptions in the method examples. Details are not described herein again.

The communications apparatus 1800 may further include at least one memory 1830, configured to store a program instruction and/or data. The memory 1830 is coupled to the processor 1820. Couplings in the embodiments of this application are indirect couplings or communication connections between apparatuses, units, or modules, may be electrical, mechanical, or another form, and are used for information exchange between the apparatuses, the units, and the modules. The processor 1820 may cooperate with the memory 1830. The processor 1820 may execute the program instruction stored in the memory 1830. At least one of the at least one memory 1830 may be included in the processor 1820.

The communications apparatus 1800 may further include a communications interface 1810, configured to communicate with another device through a transmission medium, so that an apparatus in the communications apparatus 1800 may communicate with the another device. The communications interface may be a circuit, a component, an interface, a bus, a software module, a transceiver, or any other apparatus that can implement communication. For example, the communications interface 1810 is, for example, a transceiver, or is understood as, for example, a radio frequency transceiver component in the communications apparatus 1800, or is understood as an interface of a radio frequency transceiver component in the communications apparatus 1800. For example, the another device may be a network device or a terminal device. The processor 1820 may send and receive data through the communications interface 1810, and may implement S103 and S203 shown in FIG. 8a or FIG. 8b, and/or be configured to support another process the technology described in this specification.

In an embodiment of this application, a connection medium among the communications interface 1810, the processor 1820, and the memory 1830 is not limited. In an embodiment of this application, in FIG. 18, the memory 1830, the processor 1820, and the communications interface 1810 are connected through a bus 1840. The bus is indicated by using a thick line in FIG. 18. A connection manner between other components is merely an example for description, and is not limited thereto. The bus may be classified into an address bus, a data bus, a control bus, and the like. For ease of representation, only one thick line is used to represent the bus in FIG. 18, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the methods disclosed with reference to the embodiments of this application may be directly performed by a hardware processor, or may be performed by using a combination of hardware in the processor and a software module.

In the embodiments of this application, the memory may be a non-volatile memory, such as a hard disk drive (HDD) or a solid-state drive (SSD), or may be a volatile memory, such as a random-access memory (RAM). The memory is any other medium that can be configured to carry or store expected program code in a form of an instruction or a data structure and that can be accessed by a computer. However, the memory is not limited thereto. The memory in an embodiment of this application may alternatively be a circuit or any other apparatus that can implement a storage function, and is configured to store a program instruction and/or data.

An embodiment of this application further provides a computer-readable storage medium, including an instruction. When the instruction is run on a computer, the computer is enabled to perform the method in the embodiments of this application.

An embodiment of this application further provides a computer program product, including an instruction. When the computer program product runs on a computer, the computer is enabled to perform the method in the embodiments of this application.

An embodiment of this application provides a chip system. The chip system includes a processor, and may further include a memory, to implement the method in the embodiments of this application. The chip system may include a chip, or may include a chip and another discrete component.

An embodiment of this application provides a communications system. The communications system includes the foregoing network device and the foregoing terminal device.

All or some of the foregoing methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to an embodiments of this application are all or partially generated. The computer may be a general-purpose computer, a dedicated computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

Obviously, one of ordinary skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data sending method, comprising:
   determining M data parts corresponding to N transport blocks (TBs), including determining M code blocks (CBs) based on the N TBs, wherein the M CBs are the M data parts, N is an integer greater than or equal to 1, and M is an integer greater than or equal to 2;
   mapping the M data parts to Q bandwidth parts (BWPs), wherein Q is an integer greater than or equal to 2, wherein one of the N TBs corresponds to at least two data parts, and wherein the at least two data parts are respectively mapped to different BWPs; and
   sending the M data parts in the Q BWPs, wherein a same TB is sent by using a plurality of discrete frequency resources including the Q BWPs; and
   when M is less than Q, combining the M CBs into S bits, and mapping the S bits to the Q BWPs to evenly map the M data parts to the Q BWPs, wherein S is greater than or equal to Q.

2. The method according to claim 1, wherein the determining M data parts corresponding to N TBs comprises:
   determining M bits based on the N TBs, wherein the M bits are the M data parts;
   determining the M CBs based on the N TBs, performing channel coding on the M CBs to obtain M encoded output blocks, and determining the M data parts based on the M encoded output blocks;
   determining P CBs based on the N TBs, performing channel coding on the P CBs to obtain P encoded output blocks, determining M encoded code block groups (CBGs) based on the P encoded output blocks, wherein each encoded CBG corresponds to at least one CB, and determining the M data parts based on the M encoded CBGs, wherein P is an integer greater than or equal to M; or
   determining M symbols based on the N TBs, and determining the M data parts based on the M symbols.

3. The method according to claim 1, wherein the mapping the M data parts to the Q BWPs comprises:
   evenly mapping the M data parts to the Q BWPs.

4. The method according to claim 3, wherein the evenly mapping the M data parts to the Q BWPs comprises:
   mapping F data parts to each of Q-1 BWPs comprised in the Q BWPs, wherein F is an integer obtained after $$\frac{M}{Q}$$

is rounded off; and
   mapping M−(Q−1)·F data parts to one BWP, comprised in the Q BWPs, other than the Q-1 BWPs.

5. The method according to claim 3, wherein the evenly mapping the M data parts to the Q BWPs comprises:
   if $M_1$ is equal to 0, mapping $$\frac{M}{Q}$$

data parts to each of the Q BWPs; or
   if $M_1$ is greater than 0, mapping $$\left\lceil \frac{M}{Q} \right\rceil$$

data parts to each of $M_1$ BWPs comprised in the Q BWPs, and mapping $$\left\lfloor \frac{M}{Q} \right\rfloor$$

data parts to each BWP, comprised in the Q BWPs, other than the $M_1$ BWPs, wherein $M_1$ satisfies a formula: $M_1 = \mathrm{mod}(M,Q)$.

6. A data sending apparatus, comprising:
a transceiver;
a processor; and
a memory storing a computer program, which when executed by the processor, cause the processor to perform following operations:
determining M data parts corresponding to N transport blocks (TBs), including determining M code blocks (CBs) based on the N TBs, wherein the M CBs are the M data parts, N is an integer greater than or equal to 1, and M is an integer greater than or equal to 2;
mapping the M data parts to Q bandwidth parts (BWPs), wherein Q is an integer greater than or equal to 2, one of the N TBs corresponds to at least two data parts, and the at least two data parts are respectively mapped to different BWPs; and
sending the M data parts in the Q BWPs by using the transceiver, wherein a same TB is sent by using a plurality of discrete frequency resources including the Q BWPs; and
when M is less than Q, combining the M CBs into S bits, and mapping the S bits to the Q BWPs to evenly map the M data parts to the Q BWPs, wherein S is greater than or equal to Q.

7. The apparatus according to claim 6, wherein the processor is to:
determine M bits based on the N TBs, wherein the M bits are the M data parts;
determine the M CBs based on the N TBs, perform channel coding on the M CBs to obtain M encoded output blocks, and determine the M data parts based on the M encoded output blocks;
determine P CBs based on the N TBs, perform channel coding on the P CBs to obtain P encoded output blocks, determine M encoded code block groups (CBGs) based on the P encoded output blocks, wherein each encoded CBG corresponds to at least one CB, and determine the M data parts based on the M encoded CBGs, wherein P is an integer greater than or equal to M; or
determine M symbols based on the N TBs, and determine the M data parts based on the M symbols.

8. The apparatus according to claim 6, wherein the processor is to:
evenly map the M data parts to the Q BWPs.

9. The apparatus according to claim 8, wherein the processor is to:
map F data parts to each of Q-1 BWPs comprised in the Q BWPs, wherein F is an integer obtained after $$\frac{M}{Q}$$

is rounded off; and
map M−(Q−1)·F data parts to one BWP, comprised in the Q BWPs, other than the Q-1 BWPs.

10. The apparatus according to claim 8, wherein the processor is to:

if $M_1$ is equal to 0, map $$\frac{M}{Q}$$

data parts to each of the Q BWPs; or
if $M_1$ is greater than 0, map $$\left\lceil \frac{M}{Q} \right\rceil$$

data parts to each of $M_1$ BWPs comprised in the Q BWPs, and map $$\left\lfloor \frac{M}{Q} \right\rfloor$$

data parts to each BWP, comprised in the Q BWPs, other than the $M_1$ BWPs, wherein $M_1$ satisfies a formula: $M_1 = \mathrm{mod}(M,Q)$.

11. An apparatus, comprising:
a communications interface; and
a processor to receive, in Q bandwidth parts (BWPs) through the communications interface, M data parts corresponding to N transport blocks TBs, including determining M code blocks (CBs) based on the N TBs, wherein the M CBs are the M data parts, N is an integer greater than or equal to 1, M is an integer greater than or equal to 2, Q is an integer greater than or equal to 2, Q is less than or equal to M, one of the N TBs corresponds to at least two data parts, and wherein the at least two data parts are respectively mapped to different BWPs, wherein a same TB is sent by using a plurality of discrete frequency resources including the Q BWPs, and when M is less than Q, combining the M CBs into S bits, and mapping the S bits to the Q BWPs to evenly map the M data parts to the Q BWPs, wherein S is greater than or equal to Q.

12. The apparatus according to claim 11,
wherein the M data parts are M bits corresponding to the N TBs;
wherein the M data parts are based on M encoded output blocks, wherein the processor is configured to perform channel decoding on the M encoded output blocks to obtain the M CBs, the M CBs corresponds to the N TBs;
wherein the M data parts are based on M encoded code block groups (CBGs) the M CBGs corresponds to P encoded output blocks, the processor is configured to perform channel decoding on the P encoded output blocks to obtain P CBs the P CBs corresponds to the N TBs; or
wherein the M data parts are based on M symbols, the M symbols are based on the N TBs.

13. The apparatus according to claim 11, wherein the processor through the communications interface:
evenly receives the M data parts in the Q BWPs.

14. The apparatus according to claim 13, wherein the processor through the communications interface:
receives F data parts in each of Q-1 BWPs comprised in the Q BWPs, wherein F is an integer obtained after $$\frac{M}{Q}$$

is rounded off; and receives M−(Q−1)·F data parts in one BWP, comprised in the Q BWPs, other than the Q-1 BWPs.

15. The apparatus according to claim 13, wherein the processor through the communications interface:

if $M_1$ is equal to 0, receives $$\frac{M}{Q}$$

data parts in each of the Q BWPs; or if $M_1$ is greater than 0, receives $$\left\lceil \frac{M}{Q} \right\rceil$$

data parts in each of $M_1$ BWPs comprised in the Q BWPs, and receives $$\left\lfloor \frac{M}{Q} \right\rfloor$$

data parts in each BWP, comprised in the Q BWPs, other than the $M_1$ BWPs, wherein $M_1$ satisfies a formula: $M_1$=mod(M,Q).

* * * * *